United States Patent
Bösl et al.

(10) Patent No.: US 9,664,834 B2
(45) Date of Patent: May 30, 2017

(54) OPTICAL FILM

(75) Inventors: Ellen R. Bösl, Eagan, MN (US); Bert T. Chien, St. Paul, MN (US); Carsten Franke, St. Paul, MN (US); Shandon D. Hart, Corning, NY (US); Brent A. Hedding, Hudson, WI (US); Donovan C. Karg, Jr., Vadnais Heights, MN (US); Thomas J. Ludemann, Maplewood, MN (US); Meghan A. Bradley, Simpsonville, SC (US); Mark B. O'Neill, Stillwater, MN (US); Jeffrey A. Peterson, Lake Elmo, MN (US); Joan M. Strobel, Maplewood, MN (US); Huiwen Tai, Woodbury, MN (US); John F. Van Derlofske, III, Minneapolis, MN (US); Michael F. Weber, Shoreview, MN (US); Chiu Ping Wong, Vadnais Heights, MN (US); Richard J. Pokorny, Maplewood, MN (US); John P. Baetzold, North St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 1470 days.

(21) Appl. No.: 12/935,485

(22) PCT Filed: Mar. 30, 2009

(86) PCT No.: PCT/US2009/038736
§ 371 (c)(1),
(2), (4) Date: Dec. 20, 2010

(87) PCT Pub. No.: WO2009/123949
PCT Pub. Date: Oct. 8, 2009

(65) Prior Publication Data
US 2011/0103036 A1    May 5, 2011

Related U.S. Application Data

(60) Provisional application No. 61/041,112, filed on Mar. 31, 2008.

(51) Int. Cl.
*G02B 5/30* (2006.01)
*G02F 1/1335* (2006.01)
*G02F 1/13363* (2006.01)

(52) U.S. Cl.
CPC ......... *G02B 5/3083* (2013.01); *G02B 5/3033* (2013.01); *G02F 1/133606* (2013.01);
(Continued)

(58) Field of Classification Search
CPC ................ G02B 5/3083; G02B 5/3033; G02F 1/133606; G02F 1/133634;
(Continued)

(56) References Cited

U.S. PATENT DOCUMENTS 3,610,729 A    10/1971   Rogers
4,072,779 A    2/1978    Knox
(Continued)

FOREIGN PATENT DOCUMENTS

EP    0978753       2/2000
JP    2000-221507   8/2000
(Continued)

OTHER PUBLICATIONS

ASTM Designation: D 4065-06, Standard Practice for Plastics: Dynamic Mechanical Properties: Determination and Report of Procedures, 2006.
(Continued)

*Primary Examiner* — Stephen F Husar
(74) *Attorney, Agent, or Firm* — Daniel J. Iden

(57) ABSTRACT

An optical film that includes a reflective polarizer and a stretched polymer film is disclosed. The stretched polymer
(Continued)

film is laminated to the reflective polarizer, and the stretched polymer film exhibits a refractive index symmetry point at an angle of incidence in air of at least about 60 degrees in a plane of incidence parallel to a direction of greatest stretch.

23 Claims, 8 Drawing Sheets

(52) U.S. Cl.
CPC .... *G02F 1/13362* (2013.01); *G02F 1/133536* (2013.01); *G02F 1/133634* (2013.01); *G02F 2001/133531* (2013.01); *G02F 2001/133543* (2013.01); *G02F 2413/12* (2013.01)

(58) Field of Classification Search
CPC ..... G02F 2001/133543; G02F 1/13362; G02F 1/133536; G02F 2001/133531; G02F 2413/12
USPC .............. 362/97.1–97.4, 600, 606, 607, 610, 362/615–629, 561; 359/483.01–494.01
See application file for complete search history.

(56) References Cited

U.S. PATENT DOCUMENTS

| | | | |
|---|---|---|---|
| 4,098,952 A | 7/1978 | Kelly | |
| 4,379,039 A | 4/1983 | Fujimoto | |
| 4,446,305 A | 5/1984 | Rogers | |
| 4,540,623 A | 9/1985 | Im | |
| 5,103,337 A | 4/1992 | Schrenk | |
| 5,360,659 A | 11/1994 | Arends | |
| 5,391,429 A | 2/1995 | Otani | |
| 5,427,835 A | 6/1995 | Morrison | |
| 5,448,404 A | 9/1995 | Schrenk | |
| 5,474,730 A | 12/1995 | Gust | |
| 5,706,068 A * | 1/1998 | Abileah et al. | 349/120 |
| 5,751,388 A | 5/1998 | Larson | |
| 5,793,456 A | 8/1998 | Broer | |
| 5,825,542 A | 10/1998 | Cobb, Jr. | |
| 5,825,543 A | 10/1998 | Ouderkirk | |
| 5,828,488 A | 10/1998 | Ouderkirk | |
| 5,867,316 A | 2/1999 | Carlson | |
| 5,882,774 A | 3/1999 | Jonza | |
| 6,020,944 A * | 2/2000 | Hoshi | 349/62 |
| 6,122,103 A | 9/2000 | Perkins | |
| 6,157,490 A | 12/2000 | Wheatley | |
| 6,179,948 B1 | 1/2001 | Merrill | |
| 6,235,850 B1 | 5/2001 | Perez | |
| 6,297,906 B1 * | 10/2001 | Allen et al. | 359/489.12 |
| 6,339,501 B1 | 1/2002 | Kameyama | |
| 6,352,761 B1 | 3/2002 | Hebrink | |
| 6,368,699 B1 | 4/2002 | Gilbert | |
| 6,373,541 B1 | 4/2002 | Sekime | |
| 6,480,248 B1 | 11/2002 | Lee | |
| 6,497,946 B1 | 12/2002 | Kretman | |
| 6,521,732 B2 | 2/2003 | Perez | |
| 6,531,230 B1 | 3/2003 | Weber | |
| 6,593,423 B1 | 7/2003 | Kondos | |
| 6,641,883 B2 | 11/2003 | Weber | |
| 6,783,349 B2 | 8/2004 | Neavin | |
| 6,801,276 B1 * | 10/2004 | Epstein et al. | 349/112 |
| 6,827,886 B2 | 12/2004 | Neavin | |
| 6,893,731 B2 | 5/2005 | Kausch | |
| 6,917,399 B2 | 7/2005 | Pokorny | |
| 6,927,900 B2 | 8/2005 | Liu | |
| 6,937,303 B2 | 8/2005 | Jang | |
| 6,972,813 B1 | 12/2005 | Toyooka | |
| 6,991,695 B2 | 1/2006 | Tait | |
| 7,018,689 B2 | 3/2006 | Lee | |
| 7,041,365 B2 | 5/2006 | Kausch | |
| 7,083,847 B2 * | 8/2006 | Jonza et al. | 428/212 |
| 7,180,666 B2 | 2/2007 | Benoit | |
| 7,220,026 B2 | 5/2007 | Ko | |
| 7,277,141 B2 | 10/2007 | Pokorny | |
| 7,306,835 B2 | 12/2007 | Hong | |
| 7,320,538 B2 | 1/2008 | Ko | |
| 7,416,309 B2 | 8/2008 | Ko | |
| 7,557,989 B2 | 7/2009 | Cross | |
| 7,905,650 B2 | 3/2011 | Ma | |
| 2001/0031837 A1 | 10/2001 | Perez | |
| 2002/0159019 A1 | 10/2002 | Pokorny | |
| 2004/0099992 A1 | 5/2004 | Merrill | |
| 2004/0190138 A1 | 9/2004 | Toyomasu | |
| 2005/0248928 A1 | 11/2005 | Benoit | |
| 2006/0027321 A1 | 2/2006 | Schaffer | |
| 2006/0029784 A1 | 2/2006 | Doan | |
| 2006/0074214 A1 | 4/2006 | Kesselmayer | |
| 2006/0084780 A1 | 4/2006 | Hebrink | |
| 2006/0099411 A1 | 5/2006 | Xia | |
| 2006/0103777 A1 | 5/2006 | Ko | |
| 2006/0162857 A1 | 7/2006 | Nagamoto | |
| 2006/0216524 A1 | 9/2006 | Klun | |
| 2006/0221447 A1 | 10/2006 | DiZio | |
| 2006/0226561 A1 | 10/2006 | Merrill | |
| 2006/0232863 A1 | 10/2006 | Nevitt | |
| 2006/0250707 A1 | 11/2006 | Whitney | |
| 2006/0263546 A1 * | 11/2006 | Gurel et al. | 428/1.33 |
| 2006/0291055 A1 | 12/2006 | Gehlsen | |
| 2007/0024994 A1 | 2/2007 | Whitney | |
| 2007/0047080 A1 | 3/2007 | Stover | |
| 2007/0053080 A1 | 3/2007 | Harada | |
| 2007/0231561 A1 | 10/2007 | Pellerite | |
| 2007/0236636 A1 | 10/2007 | Watson et al. | |
| 2008/0002256 A1 | 1/2008 | Sasagawa | |
| 2008/0049419 A1 | 2/2008 | Ma | |
| 2008/0102262 A1 | 5/2008 | Esaki | |
| 2008/0266904 A1 | 10/2008 | Ko | |
| 2009/0029129 A1 | 1/2009 | Pellerite | |
| 2010/0165660 A1 | 7/2010 | Weber | |
| 2010/0277668 A1 | 11/2010 | Frank | |
| 2011/0014391 A1 | 1/2011 | Yapel | |
| 2011/0019280 A1 | 1/2011 | Lockridge | |
| 2011/0027493 A1 | 2/2011 | Yapel | |
| 2011/0038140 A1 | 2/2011 | Ma | |
| 2011/0043727 A1 | 2/2011 | Bösl | |
| 2011/0051040 A1 | 3/2011 | Johnson | |
| 2011/0059249 A1 | 3/2011 | Yapel | |
| 2011/0102891 A1 | 5/2011 | Derks | |

FOREIGN PATENT DOCUMENTS

| | | |
|---|---|---|
| JP | 2004-184575 A | 7/2004 |
| JP | 2004-205572 | 7/2004 |
| JP | 2006-195211 A | 7/2006 |
| JP | 2007131698 | 5/2007 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 96/19347 | 6/1996 |
| WO | WO 97/01440 | 1/1997 |
| WO | WO 99/36248 | 7/1999 |
| WO | WO 99/36262 | 7/1999 |
| WO | WO 99/39224 | 8/1999 |
| WO | WO 02-069032 A2 | 9/2002 |
| WO | WO 2004/003631 | 1/2004 |
| WO | WO 2006/110402 | 10/2006 |
| WO | WO 2006/126128 | 11/2006 |

OTHER PUBLICATIONS

ASTM Designation: D 5026-01, Standard Test Method for Plastics: Dynamic Mechanical Properties: In Tension, 2001.
International Standard ISO 11664-4 (CIE S 014-4/E), "Colorimetry—Part 4: CIE 1976 L*A*B* Colour space", First Edition, Nov. 1, 2008.
"Cure Dosage and Adhesion Promotors for Ultraviolet Curable Laminating Adhesives", DA Smith, Sartomer Co., dated Mar. 2007.
R. W. G. Hunt, "Measuring Color", 2nd Edition, Ellis Horwood Limited, (1991).

(56) References Cited

OTHER PUBLICATIONS

International Search Report for PCT/US2009/038736, 3 pgs.
H. A. Macleod, Thin-Film Optical Filters, 2nd Ed., Macmillan Publishing Co. (1986).
"Michel Lévy Color Chart: Polarized Light Conoscopic Determination", Light Microscopy, Carl Zeiss, Nov. 2002, 6 pgs.
Modern Coating and Drying Technology, editors Cohen and Gutoff, VCH Publishers, Inc., pp. 122-126, (1992).
"New Radiation Curable Polyester Acrylate Oligomers Exhibiting Superior Abrasion Resistant Properties While Offering a Cost Effective Alternative to Urethane Acrylate Oligomers", WR Schaeffer, Sartomer Co., dated Mar. 2006.
"Radiation Curable Oligomers Combining Superior Wear Properties with Enhanced Chemical and Moisture Resistance", W. Schaeffer, Sartomer Co., dated Jul. 2005.
Alfred Thelen, Design of Optical Interference Coatings, McGraw-Hill, Inc., (1989).
Tricot, "Surfactants: Static and Dynamic Surface Tension", Liquid Film Coating, Kistler and Schweizer editors, pp. 99-136, (1997).
Weber, "Giant Birefringent Optics in Multilayer Polymer Mirrors", Science, Mar. 31, 2000, vol. 287, pp. 2451-2456. XP000990141.
Written Opinion of the ISA for International Application No. PCT/US2009/038736, 7 pgs.

\* cited by examiner

OPTICAL FILM

RELATED APPLICATIONS

This application is a national stage filing under 35 U.S.C. 371 of PCT/US2009/038736, filed Mar. 30, 2009, which claims priority to U.S. Provisional Application No. 61/041,112, filed on Mar. 31, 2008, the disclosure of which is incorporated by reference in its entirety.

The following co-owned and co-pending U.S. patent applications are incorporated herein by reference: U.S. Patent Application Ser. No. 61/040,910, entitled "LOW LAYER COUNT REFLECTIVE POLARIZER WITH OPTIMIZED GAIN" , and U.S. Patent Application Ser. No. 61/041,092, entitled "ADHESIVE LAYER FOR MULTI-LAYER OPTICAL FILM," Jones et al.

BACKGROUND

Historically, simple backlight devices included only three main components: light sources or lamps, a back reflector, and a front diffuser. Such systems are still in use for general purpose advertising signs and for indoor lighting applications.

Over recent years, refinements have been made to this basic backlight design, fueled by demands in the high-growth consumer electronics industry for products that incorporate liquid crystal displays (LC displays, or LCDs), such as computer monitors, televisions, mobile phones, digital cameras, pocket-sized digital music players, and other hand-held devices. An LCD is built around an LC panel, and, because LC panels do not create light themselves, an LCD requires a source of illumination—typically either reflected ambient light, or more commonly, light from a backlight that passes through the LC panel to reach the viewer.

Refinements in backlight technology are directed toward goals such as increasing brightness or reducing power consumption, increasing uniformity, and reducing thickness. Some of these refinements can be achieved through the use of light management films such as light redirecting films (e.g., gain diffusers, turning films, prismatic brightness enhancement films, etc.) and reflective polarizing films that enable more effective and efficient use of the light emitted by the light sources in a backlight. In addition to the desire for improved technical performance, backlight makers are also motivated to provide lower cost products.

SUMMARY

In one aspect, the present disclosure provides an optical film that includes a reflective polarizer having a pass axis and a stretched polymer film. The stretched polymer film has an x-axis in a direction of greatest stretch, a z-axis normal to a plane of the stretched polymer film, and a y-axis perpendicular to both the x-axis and the z-axis. The stretched polymer film is laminated to the reflective polarizer, and the stretched polymer film exhibits a refractive index symmetry point at an angle of incidence in air of at least about 60 degrees with respect to the z-axis in an x-z plane.

In another aspect, the present disclosure provides an optical film that includes a reflective polarizer having a pass axis and a stretched polymer film. The stretched polymer film has an x-axis in a direction of greatest stretch, a z-axis normal to a plane of the stretched polymer film, and a y-axis perpendicular to both the x-axis and the z-axis. The stretched polymer film is attached to the reflective polarizer, and the stretched polymer film exhibits a refractive index symmetry point at an angle of incidence in air of at least about 60 degrees with respect to the z-axis in an x-z plane. Furthermore, the stretched polymer film comprises a polymeric material not present in the reflective polarizer.

In yet another aspect, the present disclosure provides an optical film that includes a reflective polarizer having first and second major surfaces and a first stretched polymer film laminated with a first adhesive layer to the first major surface of the reflective polarizer. The optical film also includes a second stretched polymer film laminated with a second adhesive layer to the second major surface of the reflective polarizer, and the optical film includes an optical layer disposed proximate the second stretched polymer film such that the second stretched polymer film is between the optical layer and the reflective polarizer. In this optical film, each of the first and second stretched polymer films exhibits a refractive index symmetry point at an angle of incidence in air of at least about 90 degrees.

In still another aspect, the present disclosure provides a display system having a backlight; the backlight includes an illumination device, a reflective polarizer having a pass axis, and a stretched polymer film. The stretched polymer film has an x-axis in a direction of greatest stretch, a z-axis normal to a plane of the stretched polymer film, and a y-axis perpendicular to both the x-axis and the z-axis, and the stretched polymer film is disposed such that the reflective polarizer is between the illumination device and the stretched polymer film. The stretched polymer film exhibits a refractive index symmetry point at an angle of incidence in air of at least about 60 degrees with respect to the z-axis in an x-z plane.

In still yet another aspect, the present disclosure provides a display system having a backlight in which the backlight includes a polarized illumination device having a polarization axis and a stretched polymer film. The stretched polymer film has an x-axis in a direction of greatest stretch, a z-axis normal to a plane of the stretched polymer film, and a y-axis perpendicular to both the x-axis and the z-axis. The stretched polymer film is positioned to receive a polarized light from the polarized illumination device and the stretched polymer film exhibits a refractive index symmetry point at an angle of incidence in air of at least about 60 degrees with respect to the z-axis in an x-z plane.

In a further aspect, the present disclosure provides a display system having a backlight in which the backlight includes an illumination device and a stretched polymer film. The stretched polymer film exhibits retardation of at least 3000 nm along all optical paths incident upon the stretched polymer film at an angle of incidence in air less than about 50 degrees.

In a still yet further aspect, the present disclosure provides a method of making an optical film including forming a stretched polymer film. Forming a stretched polymer film includes forming a web of a polyethylene terephthalate, stretching the web in a length direction by a first amount of about 1.05 to 1.3 times an unstretched length dimension, and stretching the web in a transverse direction by a second amount of about 3 to 7 times an unstretched transverse dimension. Forming a stretched polymer film further includes heat-setting the web, relaxing the web in the transverse direction, and relaxing the web in an oven while unrestrained in the transverse direction and under minimal tension in the length direction.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

The present disclosure is described with respect to the appended Figures, wherein.

DETAILED DESCRIPTION

Figure 1:
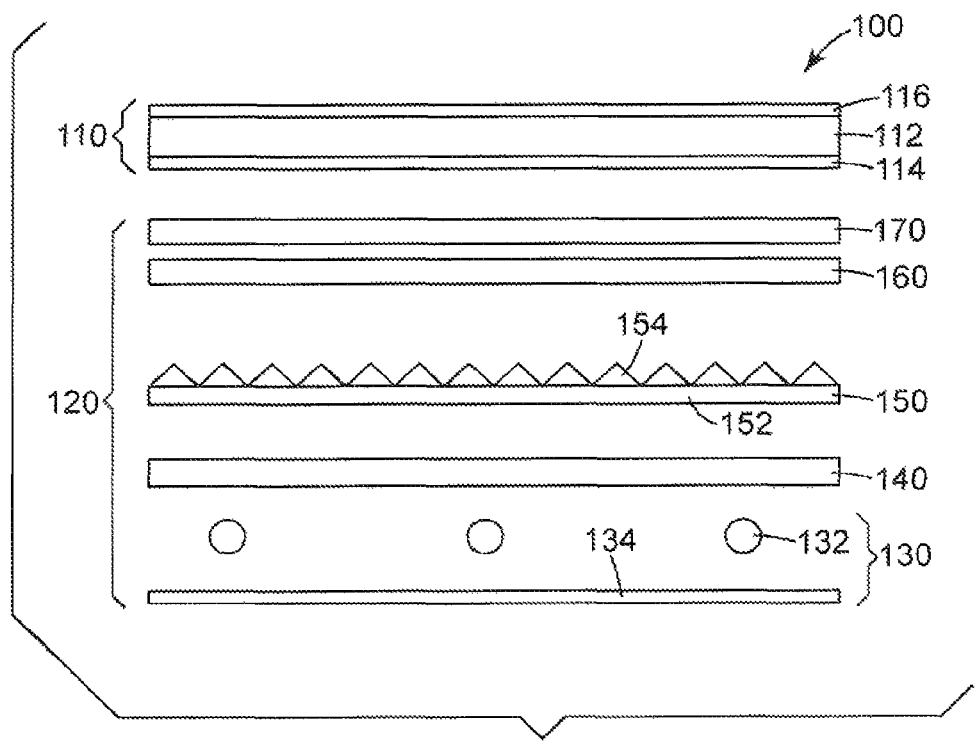
FIG. 1 is a schematic cross-sectional view of one embodiment of a display system.

The present disclosure is directed toward economical, high performance optical films, as well as backlights and displays incorporating such films.

A liquid crystal display is built around an LC panel, in which a liquid crystal with an associated electrode matrix is interleaved between a pair of absorptive polarizers. In an LC panel, portions of the liquid crystal have their optical state altered by an electric field applied via the electrode matrix. Depending on its state, a given portion (corresponding to a pixel or subpixel of the display) of the liquid crystal will rotate the polarization of light transmitted through it by a greater or lesser magnitude. Light progressing through an entry polarizer, a liquid crystal, and an exit polarizer is attenuated to varying degrees depending on the optical state of the portion of liquid crystal that the light encounters. An LC display exploits this behavior to provide an electronically-controllable display having different appearances in different areas.

A backlight of an LCD provides light to the LC panel of the display, which forms an image from only light having the "pass" polarization that is transmitted through the entry polarizer of the panel. Light incident on the LC panel having the "block" polarization is generally absorbed by the entry polarizer and wasted. It is therefore of interest to maximize the amount of pass-polarized light reaching the panel from the backlight, and to minimize the amount of block-polarized light reaching the panel.

One technique for maximizing pass-polarized light and minimizing block-polarized light is to position a reflective polarizer (RP) between a backlight and an LC panel to transmit pass-polarized light to the LC panel and reflect block-polarized light back into the backlight. The reflected block polarization light can then be transformed into light of the pass polarization and transmitted through the RP on a second or subsequent encounter. A reflective polarizer thus enables recycling of at least part of the light of the block polarization that would otherwise be wasted.

Backlights also often employ optical films other than reflective polarizers to perform a variety of functions. Directional recycling films (DRFs), discussed further herein, can be used to manage the angular distribution of light emitted by a backlight. Diffusers, also discussed further herein, may be used for a variety of purposes, including improving uniformity, masking imperfections, and preventing the appearance of moire patterns. Other films may serve non-optical functions, such as providing mechanical support, but in as far as they interact with light in the backlight, it is generally desirable that such films not deleteriously affect the output of the backlight. Furthermore, it is generally desirable that an optical film having one purpose not unintentionally result in degraded backlight performance in other ways.

Consider the aforementioned configuration in which a reflective polarizer transmits pass-polarized light to an LC panel. A backlight designer may wish to place other optical films between the RP and the LC panel. In such a case, it is generally desirable to leave the polarization of the light progressing from the RP to the LC panel unaltered by the other, intervening, optical film(s). One way to minimize or reduce the polarization effects of an intervening optical film is to form the film from a low birefringence (ideally, isotropic) film or films. For example, polycarbonate (PC), which tends to have low birefringence, has been regarded as an acceptable option for optical films between an RP and an LC panel. On the other hand, polyethylene terephthalate (PET), which typically exhibits higher anisotropy, is often regarded as unsuitable for use between an RP and an LC panel, as the retardance (or retardation) resulting from the birefringence in PET may undesirably alter the polarization of light progressing toward the LC panel.

A backlight maker will generally consider these effects and other factors in designing a backlight. The maker may avoid placing any films between the RP and the LC panel, and may elect, rather, to place a directional recycling film on the side of the RP opposite the LC panel. The maker may choose to place a directional recycling film between the RP and LC panel, and use PC as the material for the DRF to minimize polarization effects, but at greater cost than using PET. Similarly, a reflective polarizer may need to be laminated to another film to provide mechanical support, and PC may be used for such a mechanical substrate to avoid degrading optical performance. PET may provide preferable or acceptable mechanical performance and may cost less in such an application, but optical performance may disqualify its use. In general, backlight makers desire optical films made from materials that result in performance suitable for the intended application for the lowest possible cost.

In the present disclosure, we describe the use of stretched polymer films (e.g., stretched PET) in backlights, as well as methods for manufacturing such films. The films of this disclosure provide suitable performance for many backlight applications, and may result in lower cost options for backlight makers. In particular, for polymer films positioned between polarizers, such as a reflective polarizer and an entrance polarizer of an LC panel, we have discovered films and preferred orientations for the films that minimize undesirable polarization effects arising from birefringence of the films.

As mentioned herein, the optical films and backlights of the present disclosure can be used in display systems. FIG. 1 is a schematic cross-sectional view of one embodiment of a display system 100. The display system 100 includes an LC panel 110 and a backlight 120 positioned to provide light to the LC panel 110. In some embodiments, the backlight 120 includes an illumination device 130. A number of optical components, such as light management films, may be included in the backlight 120 between the illumination device 130 and the LC panel 110, as discussed further herein.

As illustrated in FIG. 1, the LC panel 110 includes a liquid crystal layer 112, an entry plate 114, and an exit plate 116. One or both of the entry and exit plates 114 and 116 can include a glass or polymer substrate, electrode matrices, alignment layers, polarizers (including dichroic polarizers), compensation films, protective layers, and other layers. A color filter array may also be included with either or both plates 114 and 116 for imposing color on the image displayed by the LC panel 110.

In the LC panel 110, portions of the liquid crystal layer 112 have their optical states altered by an electric field applied via the electrode matrix. Depending on its state, a given portion (corresponding to a pixel or subpixel of the display system 100) of the liquid crystal layer 112 will rotate the polarization of light transmitted through it by a greater or lesser magnitude. Light progressing through an entry polarizer of entry plate 114, liquid crystal layer 112, and exit polarizer of exit plate 116 is attenuated to varying degrees depending on the orientation of the polarizers and the optical state of the portion of the liquid crystal layer that the light encounters. The display system 100 exploits this behavior to provide an electronically-controllable display having different appearances in different areas.

The illumination device 130 includes one or more light sources 132. The light sources 132 can be linear, cold-cathode fluorescent lamps (CCFLs). Other types of light sources 132 may be used, however, such as other varieties of fluorescent lamps, incandescent lamps, light emitting diodes, organic light-emitting diodes, or any other light sources that are found to be suitable.

The illumination device 130 can include a back reflector 134. The back reflector 134 may be a specular reflector, a diffuse reflector, or a combination specular and diffuse reflector. One example of a specular reflector is Vikuiti™ Enhanced Specular Reflector (ESR) film, available from 3M Company. Examples of suitable diffuse reflectors include polymers loaded with diffusely reflective particles. Other examples of diffuse reflectors including microporous materials and fibril-containing materials, as discussed, e.g., in U.S. Pat. No. 6,497,946 (Kretman et al.). Other types of reflectors than those listed here may be used for the back reflector 134 as well.

The display system 100 may be described as "direct-lit," having the light sources 132 positioned directly behind the LC panel 110. In other embodiments, a display can include an edge-lit illumination device (not shown), such as a light guide with associated light sources. In general, any suitable illumination device may be used in displays of the present disclosure.

The display system 100 of FIG. 1 includes exemplary optical components in the backlight 120 between the illumination device 130 and the LC panel 110. The backlight 120 may include, for example, a diffuser 140. The diffuser 140 may be any suitable diffuser film or plate. For example, the diffuser 140 can include any suitable diffusing material or materials. In some embodiments, the diffuser 140 may include a polymeric matrix of polymethyl methacrylate (PMMA) with a variety of dispersed phases that include glass, polystyrene beads, and $CaCO_3$ particles. Exemplary diffusers can include 3M™ Scotchcal™ Diffuser Film, types 3635-30, 3635-70, and 3635-100, available from 3M Company, St. Paul, Minn.

The backlight 120 may also include, for example, a directional recycling film (DRF) 150, also referred to as a brightness enhancing layer or film. The DRF 150 includes a surface structure that redirects off-axis light in a direction closer to the normal axis of the display. This increases the amount of light propagating on-axis through the LC panel 110, thus increasing the brightness and contrast of the image seen by the viewer. The exemplary DRF 150 illustrated in FIG. 1 includes a substrate portion 152 and a structured surface layer 154, shown here as a prism layer. The substrate portion 152 and the structured surface layer 154 may be formed from different materials, or they may be composed of the same material, and they made be formed monolithically or as distinct portions of a single film.

One example of a DRF is a prismatic brightness enhancing layer, which has a number of prismatic ridges that redirect the illumination light through refraction and reflection. Examples of prismatic brightness enhancing layers that may be used in the display system 100 include the Vikuiti™ BEF II and BEF III family of prismatic films (available from 3M Company), including BEF II 90/24, BEF II 90/50, BEF HIM 90/50, and BEF HIT.

Other DRFs may be referred to as gain diffusers and include structures such as beads, rounded domes, pyramids or other structures arranged in a regular or irregular matrix array on one or both major surfaces of a film or layer. One example of a gain diffuser is Opalus BS-702, available from Keiwa Corp. Other gain diffusers are disclosed in U.S. patent and Patent Publication Nos. 2006/0103777 (Ko et al.), U.S. Pat. No. 7,320,538 (Ko et al.), U.S. Pat. No. 7,220,026 (Ko et al.), U.S. Pat. No. 7,416,309 (Ko et al.), 2006/0250707 (Whitney et al.), and 2007/0024994 (Whitney et al.). Gain diffusers may be microreplicated structured surface layers, or they may be formed, for example, by embedding beads in a binder disposed on or proximate a surface of a substrate layer. The beads may be made of any suitable transparent material known to those of ordinary skill in the art, such as organic (e.g., polymeric) or inorganic materials. The beads generally have a mean diameter in the range of, for example, 5 to 50 μm, but other bead sizes can be used. Beads of radius approximately 2, 4, 5, 8, 10, 12.5, 15, 17.5, 20, 25, 37.5, 45, 50, 60, 70 and 80 micrometers, or any radius between these exemplary values, may be used. Typically, the binder in which beads are dispersed is substantially transparent. In most exemplary embodiments, the binder material is polymeric. Depending on the intended use, the binder may be an ionizing radiation curable (e.g., UV curable) polymeric material, thermoplastic polymeric material, or an adhesive material. One exemplary UV curable binder may include urethane acrylate oligomer, e.g., Photomer™ 6010, available from Cognis Company. Further descriptions of beads, binders, refractive surface layers, and the like may be found, e.g., in U.S. Patent Publication No. 2008/0049419 (Ma, et al.)

In some embodiments, display system 100 may include multiple directional recycling films, of the same type or of different types.

Display system 100 can also include a light-redirecting film such as a turning film (not shown) that does not substantially 'recycle' light but still serves to increase the amount of light propagating along a desired axis towards a viewer.

Display system 100 can also include a reflective polarizer 160. Any suitable type of reflective polarizer may be used, e.g., multilayer optical film (MOF) reflective polarizers; diffusely reflective polarizing film, such as continuous/disperse phase polarizers; wire grid reflective polarizers; or cholesteric reflective polarizers.

Both the MOF and continuous/disperse phase reflective polarizers rely on a difference in refractive index between at least two materials, usually polymeric materials, to selectively reflect light of one polarization state while transmitting light in an orthogonal polarization state. Suitable MOF reflective polarizers are described, e.g., in co-owned U.S. Pat. No. 5,882,774 (Jonza et al.) and U.S. Patent Application Ser. No. 61/040,910, entitled "LOW LAYER COUNT REFLECTIVE POLARIZER WITH OPTIMIZED GAIN,". Commercially available examples of MOF reflective polarizers include Vikuiti™ DBEF-D280 and DBEF-D400 multilayer reflective polarizers that include diffusive surfaces, both available from 3M Company.

Examples of diffusely reflective polarizing films useful in connection with the present disclosure include continuous/disperse phase reflective polarizers as described, e.g., in co-owned U.S. Pat. No. 5,825,543 (Ouderkirk et al.), and diffusely reflecting multilayer polarizers as described, e.g., in co-owned U.S. Pat. No. 5,867,316 (Carlson et al.). Other suitable types of diffusely reflective polarizing films are described in U.S. Pat. No. 5,751,388 (Larson).

Some examples of wire grid polarizers useful in connection with the present disclosure include those described, e.g., in U.S. Pat. No. 6,122,103 (Perkins et al.). Wire grid polarizers are available, e.g., from Moxtek Inc., Orem, Utah.

Some examples of cholesteric polarizers useful in connection with the present disclosure include those described, e.g., in U.S. Pat. No. 5,793,456 (Broer et al.), and U.S. Pat. No. 6,917,399 (Pokorny et al.). Cholesteric polarizers are often provided along with a quarter wave retarding layer on the output side so that the light transmitted through the cholesteric polarizer is converted to linearly polarized light.

The reflective polarizer 160 may be free-standing in a display system 100, or it may be attached to other structures. In some embodiments, the reflective polarizer 160 may be attached to the entry plate 114 of the LC panel 110. In other embodiments, the reflective polarizer 160 may be attached to the diffuser 140.

Display system 100 can include an optical film 170. Optical film 170 may, for example, be a directional recycling film, as discussed herein, such as a prismatic brightness enhancement film or a gain diffuser. It may serve a mechanical function, for example, as a protective sheet. In some embodiments, the optical film 170 can include a stretched polymer film as is further described herein. The optical film 170 may be monolithic or it may include multiple layers. In general it may be any suitable optical film included in display system 100 for any desired purpose. Optical film 170 may be freestanding, or it may be attached on one or both sides to other optical films or layers in system 100. When reflective polarizer 160 is present in system 100, optical film 170 may be laminated or otherwise attached to the reflective polarizer to augment or enhance the mechanical properties of the reflective polarizer. The reflective polarizer 160 alone may, for example, lack sufficient part and/or dimensional stability for use in a display system 100, or it may be of a relatively delicate nature, making it difficult to handle in manufacturing, delivery, and/or assembly. In such a case, optical film 170 may have mechanical properties such that when it is attached to reflective polarizer 160, the combination is sufficiently mechanically robust to significantly improve the usability of the reflective polarizer.

When optical film 170 is placed, for example, between the reflective polarizer 160 and the entry polarizer incorporated in the entry plate 114 of the LC panel 110, we may refer to it as an inter-polarizer optical film (IPOF). In general, the reflective polarizer 160 and entry polarizer may be considered to "condition" or prepare light from the backlight for modulation by the LC layer 112 of the display system 100. Once the reflective polarizer 160 has passed light toward the LC panel from preceding optical elements of the backlight 120, it is generally undesirable to alter the polarization of the light in any unintended ways. Depending largely on its birefringence properties, optical film 170, as an IPOF, may or may not affect the polarization of light proceeding from a reflective polarizer 160 to an entry polarizer to a degree that affects the appearance of display system 100.

In addition to the example from FIG. 1 of an optical film 170 located between a reflective polarizer 160 and an LC panel 110, other scenarios in which an optical film is placed between polarizers may be contemplated, and discussions herein regarding IPOFs will generally be applicable in those situations as well. An optical film positioned between a polarized illumination device that produces polarized light and a subsequent polarizer may be considered an IPOF as well, with optical films of the present disclosure providing benefits in such a configuration. Polarized illumination devices may be described, for example, in PCT publications WO 2006/126128 (Boonekamp, et al.) and WO 2004/003631 (Benoit, et al.). Furthermore, FIG. 1 may be considered to illustrate a optical film 170 between a polarized illumination device and a polarizer (the entry polarizer incorporated in the entry plate 114), if we consider all the illustrated components between reflective polarizer 160 and back reflector 134, inclusive, to constitute said polarized illumination device.

In general, the use of highly birefringent materials between polarizers has been avoided in displays. In the majority of these applications, these birefringent films may depolarize the light, introduce excessive color artifacts, or both. The most common exceptions to this are in cases where strong diffusers are also used in the birefringent film construction to hide the resultant color, and in compensation films, which have small, tightly controlled retardation values and are intended to modify the polarization of transmitted light. In addition to producing undesirable color effects, birefringent films can also result in lower brightness gain for recycling backlights.

For polymeric optical films, birefringence generally results primarily from the intrinsic nature of the polymeric material and the manner in which the film is manufactured. A polymeric film is typically stretched during manufacture, and that orientation of the film (and, therefore, the molecules it includes) may strongly affect the birefringence of the film. Films can be stretched or oriented uniaxially or biaxially in manufacture.

Figure 2:
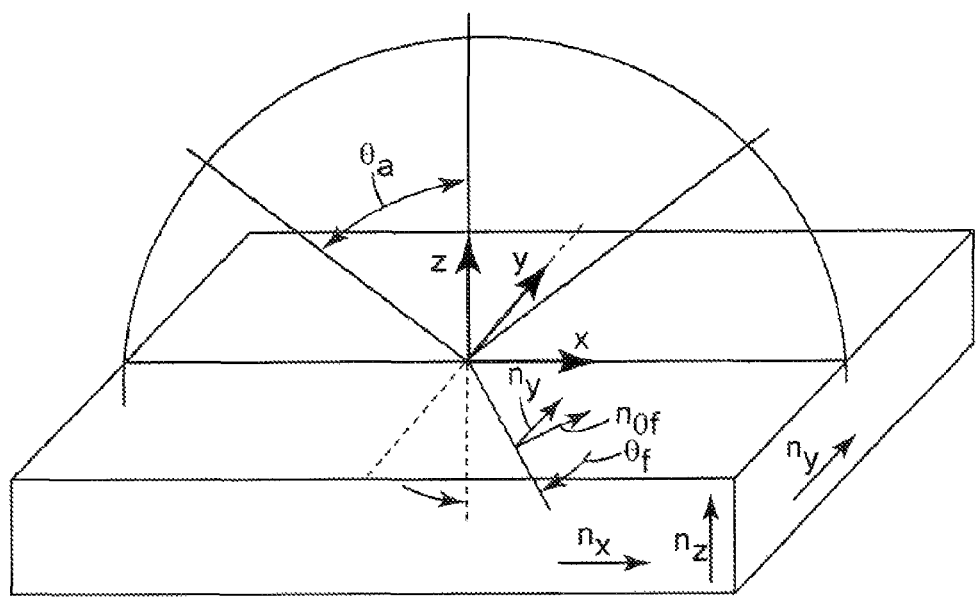
FIG. 2 is a schematic illustration of a birefringent optical film.

Generally speaking, a biaxially stretched film in which the magnitude of stretching in two directions is balanced will tend to exhibit less birefringence between axes in the plane of the film than a film that is stretched uniaxially, or in a less balanced biaxial manner. FIG. 2 is a schematic representation of an optical film illustrating the orientations of indices of refraction in an anisotropic film. $n_x$ and $n_y$ are the indices of refraction along orthogonal x and y in-plane axes of the film, while $n_z$ is the index of refraction in the out-of-plane z direction, orthogonal to the x and y directions. We will frequently use a coordinate system in this disclosure in which the x direction is the direction of greatest stretch of the film.

We have observed that biaxially oriented PET film, having typical refractive indices of approximately $n_x=1.68$, $n_y=1.64$, and $n_z=1.49$, produces a highly colorful appearance when placed between crossed or parallel polarizers and viewed at angles of incidence greater than about 40 degrees. This color was observed even when the optical axes of the PET film were most carefully aligned with the axes of the polarizers. Furthermore, PET films having a more balanced stretch, i.e., having $n_x \approx n_y$, were found to be even more colorful at incidence angles of less than 30 degrees, with the axes of the PET film carefully aligned with the axes of the polarizers. For reasons such as these, it has generally been assumed that one should not use a highly birefringent film layer between a reflective polarizer and another polarizer unless it is a very thin layer having near identical properties and axis alignment to the micro-layers of polymer film within the reflective polarizer itself that create the reflective polarizing function. See, e.g., U.S. Pat. No. 5,882,774 (Jonza, et al).

Generally speaking, color fringes can be seen when light is observed after passing through a pair of polarizers and a birefringent IPOF. The retardance experienced by a particular ray of light passing through this combination of optical elements will depend on the path the ray takes through the IPOF. The retardance alters the polarization state of different spectral components of the ray by differing amounts, leading to varying transmission through the second polarizer depending on wavelength. A graphical representation of this general phenomenon in a particular physical case is depicted in the Michel-Levy Color Chart. Dispersion is linked to these wavelength dependent effects as well.

Biaxially birefringent polymer films, which can have an $n_z$ value either less than both $n_x$ and $n_y$ or greater than both $n_x$ and $n_y$, where $n_x$ and $n_y$ are the maximum and minimum in-plane indices, have two angles of incidence in air ($\pm\theta_{sa}$ in the plane of incidence along the x axis) at which the retardance of the film is zero. The retardance increases for all other $\theta$ and $\phi$ directions away from these points (where $\phi$ represents azimuthal displacements from the points, i.e., rotation relative to the z-axis). For many films, these two zero points and concentric rings of colored retardation fringes can be observed by viewing a diffuse light source through two polarizers and the birefringent IPOF using a wide angle lens (conoscope), or with the naked eye at the proper angle. Low and medium retardance values of one to several wavelengths can create very intense colors, whereas high retardance values (>~5λ) create a muted color due to the rapid oscillation of transmitted light as a function of wavelength.

Figure 3:
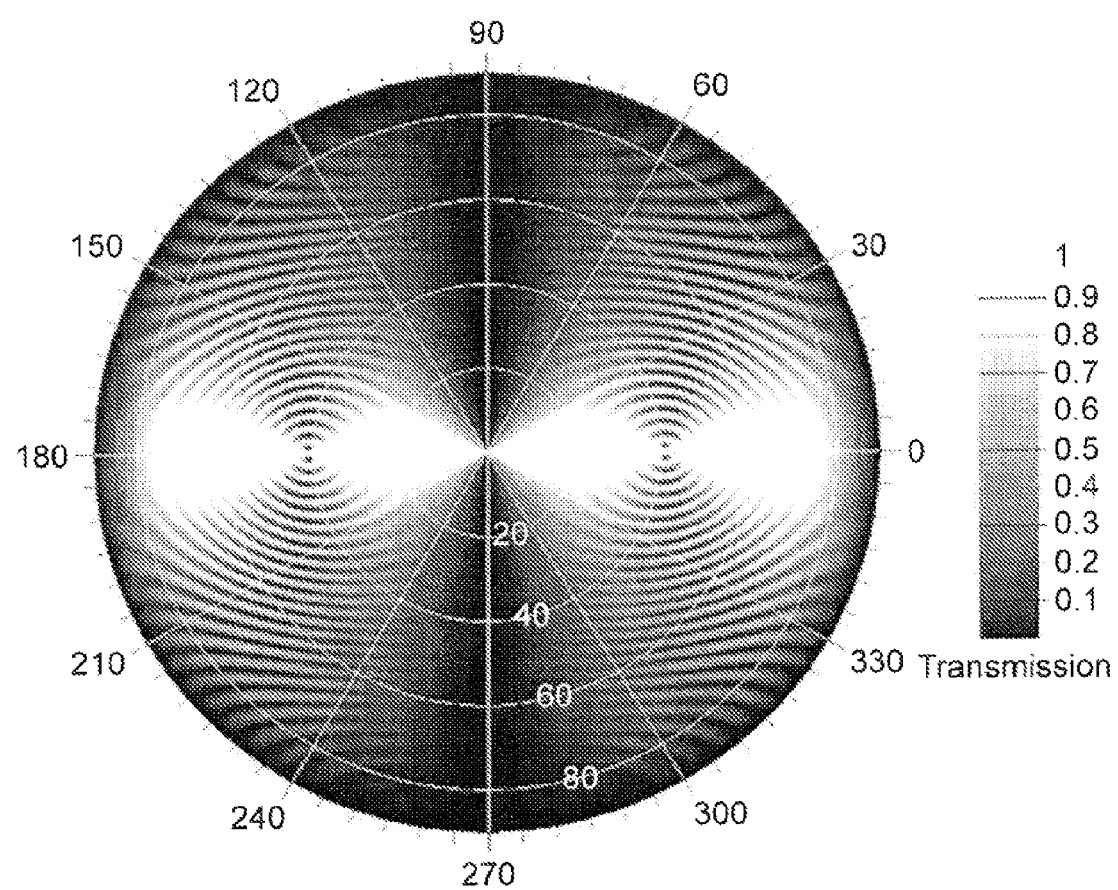
FIG. 3 is a conoscopic plot of calculated light transmission intensity through a film stack that includes parallel absorbing polarizers and a biaxially stretched PET film disposed between the polarizers.

This effect can be understood with the help of conoscopic plots such as that of FIG. 3. FIG. 3 is a plot of calculated light transmission intensity through a film stack that includes parallel absorbing polarizers and a biaxially stretched PET film between the polarizers, with the modeled film having a thickness of 125 micrometers and refractive indices of $n_x=1.675$, $n_y=1.641$, $n_z=1.4906$. The polarizers' pass axes are aligned with the x-axis, which is the slow (high index) axis of the PET. The plot axes are the angles of elevation ($\theta_a$; annular concentric circles), and azimuthal angle ($\phi$; around the circle); in this conoscopic plot, each point on the plot represents an angle of view. For this plot, calculated for incident light of 600 nm wavelength, the angles of incidence at which the retardance is zero, which are sometimes referred to herein as "refractive index symmetry points," are at the points to the left and right of center along the x-axis at about $\theta_{sa}=\pm41$ degrees. Clearly visible in this plot are concentric arcs of alternating high and low transmission of light that are centered around these symmetry points. Retardation values increase with distance from these symmetry points. For example, adjacent rings (bright-to-bright or dark-to-dark) represent one wavelength difference in retardation.

The plot of FIG. 3 was calculated for monochromatic light at 600 nm. At other wavelengths, the pattern of light and dark rings will scale in radius with the wavelength. The transmission for a continuous range of wavelengths, such as white light, will reflect the combined transmission of all wavelengths in the range; since different spectral components have their maxima and minima of transmission at different locations, a colored pattern results. In the context of a display backlight, this colored pattern may be highly objectionable. The colored pattern is characteristically more pronounced close to a symmetry point. For observation angles farther from the symmetry points, the transmission intensity patterns for constituent spectral components can vary rapidly with small changes in observation angle and can lead to a more muted color pattern.

From studies of plots of this type for films having a range of birefringence characteristics, along with observations of actual films between polarizers, two criteria stand out for designing a low color IPOF for use in a display backlight. One is that the two symmetry points generally not be visible within the viewing angles or viewing cone of the display. Equations describing the locations of symmetry points depending on film indices are presented herein. Note that the locations of the symmetry points are independent of film thickness. The second criterion is that the retardance of the film should be high enough to give acceptable color within the viewing angles or viewing cone of the display. This second criterion may be met with the use of thick, highly birefringent films, as retardance increases with film thickness. Thicker films may also provide other advantages, e.g., improved mechanical performance.

We note that the first criterion, that symmetry points generally not be visible within the viewing cone of the display, is a necessary but not sufficient condition for achieving high retardance within the viewing cone. Because birefringence is zero along the symmetry point directions, retardance will always be zero along those directions as well, regardless of film thickness. As the viewing angle departs from a symmetry point, however, birefringence and retardance increase, the latter also having a value in proportion to the thickness of the film.

The symmetry points correspond to rays propagating through the birefringent film in directions that experience zero birefringence. This may be appreciated with reference to FIG. 2, which schematically represents an anisotropic film. In general, an arbitrary light ray propagating through this film experiences indices of refraction $n_x$, $n_y$, and $n_z$. However, because the electric field oscillates orthogonally to the propagation direction of the ray, the indices of refraction in the plane orthogonal to the direction of propagation of the ray are of particular importance. Restricting our attention to a ray propagating within the film in the x-z plane at an angle of incidence of $\theta_f$ (the subscript "f" denoting film; "a" will denote an angle in air) we can resolve the relevant indices of refraction experienced by the ray into two orthogonal s-polarized and p-polarized components, $n_y$ and $n_{\theta f}$. $n_{\theta f}$ is the index of refraction experienced by the p-polarized component of the electromagnetic wave of the ray in the x-z plane, and incorporates the combined influence of $n_x$ and $n_z$. It can be calculated from equation 1:

$$\frac{1}{n_{\theta f}^2} = \frac{\cos^2\theta_f}{n_x^2} + \frac{\sin^2\theta_f}{n_z^2}. \quad \text{Equation 1}$$

When $n_y$ and $n_{\theta f}$ are equal, the ray travels along a path of zero birefringence, which is along a direction corresponding to a symmetry point. From Equation 1, we can derive an expression to find $\theta_{sf}$ given the indices of refraction (the subscript "s" denoting the symmetry point):

$$\sin^2\theta_{sf} = \frac{n_z^2(n_x^2 - n_y^2)}{n_y^2(n_x^2 - n_z^2)}, \quad \text{Equation 2.}$$

$\theta_{sf}$ is the angle in the film for a ray propagating along a path of zero birefringence. A ray propagating in air in the x-z plane at an angle of incidence of $\theta_{sa}$ with respect to the air-film interface (the x-y plane) will refract into the film at an angle of $\theta_{sf}$ when the following condition is met:

$$\sin^2\theta_{sa} = \frac{n_z^2(n_x^2 - n_y^2)}{(n_x^2 - n_z^2)}. \quad \text{Equation 3}$$

For certain $n_x$, $n_y$, $n_z$ index sets, there may be a solution to Equation 2 for $\theta_{sf}$, but not for Equation 3 for $\theta_{sa}$. This corresponds to a direction of propagation in the film that can not be accessed by refraction into the film from air. Equivalently, a ray of light propagating in the film at $\theta_{sf}$ will experience total internal reflection at the film-air interface. In such a situation, we may refer to the ray as having an angle of incidence in air of greater than 90 degrees. A film having symmetry points with angles of incidence in air of greater than 90 degrees will generally meet the first of the criteria suggested herein for a low color IPOF, i.e., that the symmetry points not be visible within the viewing cone of the display, since the symmetry points are not visible from air. Films having symmetry points at less than 90 degrees may still meet the first criterion, as many display applications require considerably narrower viewing cones. In some embodiments, IPOFs may be suitable for applications having symmetry points at angles of incidence in air of 60, 70, 80, 90, or greater than 90 degrees.

One embodiment of a stretched polymer film that may provide low color when used between polarizers is characterized by an index set meeting the following criteria: (i) $n_x > n_y > n_z$, (ii) $n_z < \sim 1.52$, and (iii) $n_x - n_y \geq \sim 0.06$. Such a film may be produced from, for example, stretching PET in a substantially uniaxial manner.

Figure 4:
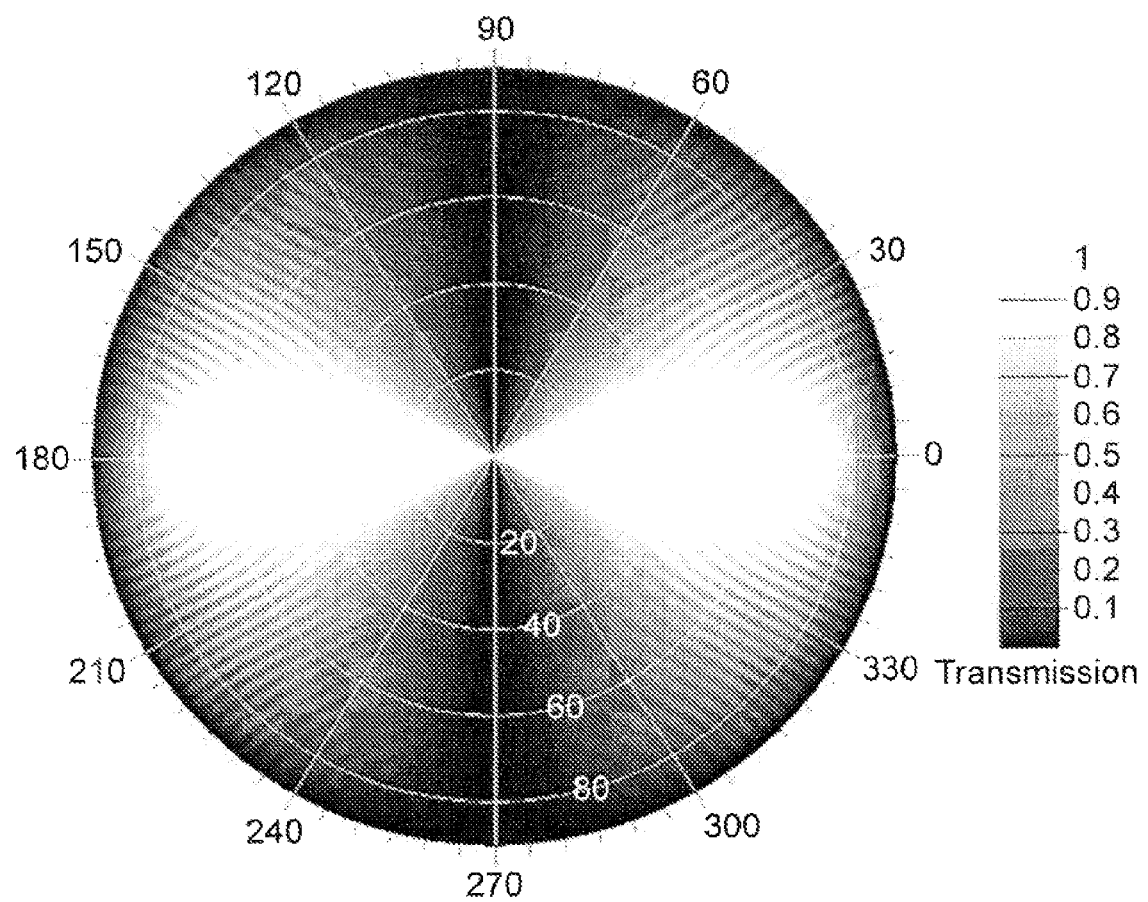
FIG. 4 is a conoscopic plot of calculated light transmission intensity through a film stack that includes parallel absorbing polarizers and a substantially uniaxially oriented PET film disposed between the polarizers.

To help visualize the advantages of an inter-polarizer optical film of the present disclosure, FIG. 4, which may be compared to FIG. 3, is a plot of calculated light transmission intensity through parallel absorbing polarizers and a substantially uniaxially oriented (stretched) PET film positioned between the polarizers, with the modeled film having a thickness of 125 micrometers and refractive indices of $n_x = 1.6801$, $n_y = 1.5838$, $n_z = 1.5130$. For these indices of refraction, the symmetry points are located at an angle of incidence in air $\theta_{sa}$ greater than 90 degrees, which is reflected by the fact that symmetry points are not seen in the plot.

Returning to the second criterion for a low color IPOF, i.e., that the retardance be high enough to give acceptable color within the viewing angles or viewing cone of the display, we note that we generally observe muted color in films having high retardance values. For some uses, the minimum retardation within the field of use should be at least about five wavelengths, that is, the edge of the field of view should be at least about five retardation fringes from a symmetry point. In cases where color variations are still found to be objectionable, a diffuser may be added to mask the color. Retardance may be measured by a polarimeter, available, e.g., from Axometrics, Inc. In some embodiments, acceptable color is observed for films having, within viewing cones of interest, retardance values of greater than 3000 nm, 4000 nm, 5000 nm, 6000 nm, 7000 nm, 8000 nm, 9000 nm, 10000 nm, or more. Viewing cones of interest where the retardance should be greater than these values may include those viewing cones encompassing all optical paths incident at angles within 40, 50, 60, 70, 80, or 90 degrees to the principal viewing axis.

To further our understanding of the relationship between retardance values and acceptability for use as IPOFs, we consider five birefringent films. Two of the films were formed of PET, two of syndiotactic polystyrene (sPS), and one, labeled tentered PC, represents a polycarbonate-like film, although these exact indices may not be attainable with true PC. The PET and sPS films represent actual physical samples. The indices of refraction of these films were measured and the retardation for light incident in the x-z plane was calculated. All values of retardation were then adjusted to a film of thickness 125 micrometers for the purpose of clarity in the following comparisons.

TABLE I

Measured Refractive Indices for Various Films

|  | $n_x$ | $n_y$ | $n_z$ |
| --- | --- | --- | --- |
| Biaxed PET | 1.682 | 1.638 | 1.490 |
| Tentered PET | 1.683 | 1.584 | 1.511 |
| Tentered PC (calculated) | 1.603 | 1.584 | 1.564 |
| Tentered sPS | 1.530 | 1.615 | 1.620 |
| Biaxed sPS | 1.556 | 1.584 | 1.625 |

Figure 5:
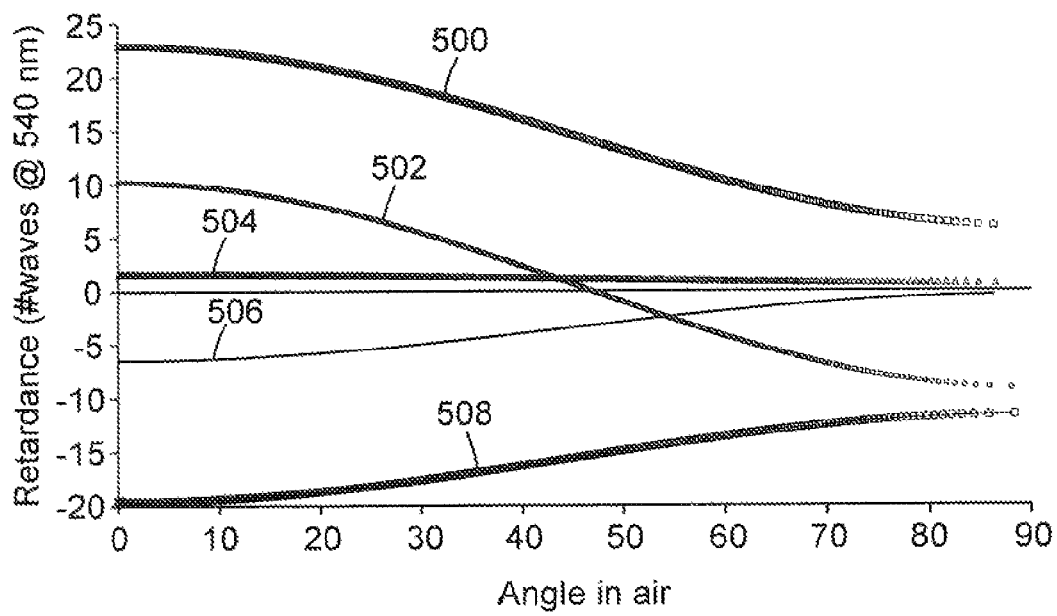
FIG. 5 is a plot of retardance vs. angle of incidence for a number of polymeric films.

The retardation as a function of angle of incidence in the x-z plane was calculated for films with these indices and the results are plotted in FIG. 5. The "biaxed PET" film was oriented using a sequential film-making line, as is common in commercial production of PET film. Such orientation is typically not quite symmetrical. The term tentered film refers to a film that is stretched primarily only in one direction with the orthogonal dimension constrained to a constant dimension, which is what occurs in a standard film tenter when length orientation is not employed. Tentered sPS exhibits refractive indices close to that of a true uniaxial film. This is due to the crystal symmetry of the sPS.

Note the large differences in the retardation values of the two PET films (curves 500 and 502 of FIG. 5). The retardance of the biaxially oriented PET (Curve 502) crosses the zero line at about 45 degrees incidence in air. When viewed using a conoscope, this sample, which was 125 micrometers thick, exhibited highly colored fringes that formed approximate circles around the points of zero retardation. A 50 micrometer thick film with similar indices was observed to have zero retardation points in the same locations, but exhibited much more widely spaced fringes. The fifth fringe of the latter sample extended almost to the center of view (normal incidence).

The PET film that was stretched primarily in the cross-web direction (tentered) exhibited closely spaced fringes, but the center of curvature was well outside of the angle of view of the conoscope. Curve 500 indicates that these symmetry points are not observable in air, showing only about the 6th fringe at 90 degrees angle of incidence.

Curve 504 is listed as polycarbonate (PC), even though these exact indices may not be attainable with PC. It is intended to represent a class of low birefringence films that have zero retardance points beyond 90 degrees in air, but which also exhibit low to moderate birefringence. The color observed with these films can be objectionable, even when coated with a diffuse coating, since these films exhibit broad minima and maxima intensity modulations as a function of wavelength.

Curves 506 and 508 were calculated using the indices measured on biaxially stretched and constrained uniaxially stretched (tentered) films of sPS. The films were approximately 50 micrometers thick and the retardance curves were calculated assuming film thicknesses of 125 micrometers. Brightly colored fringes were observed with the 50 micrometer thick biaxially stretched sPS film. From Curve 506, it is evident that low order fringes are observed at 45 degrees, especially for a 50 micrometer thick film. The tentered film is predicted by curve 508 to have very high order fringes at all angles of incidence. Only slight color was observable with the 50 micrometer thick, tentered sPS film near 75 degrees angle of incidence. The same type of film at 125 micrometer thickness would exhibit much less, perhaps vanishingly little, observable color.

Figure 6:
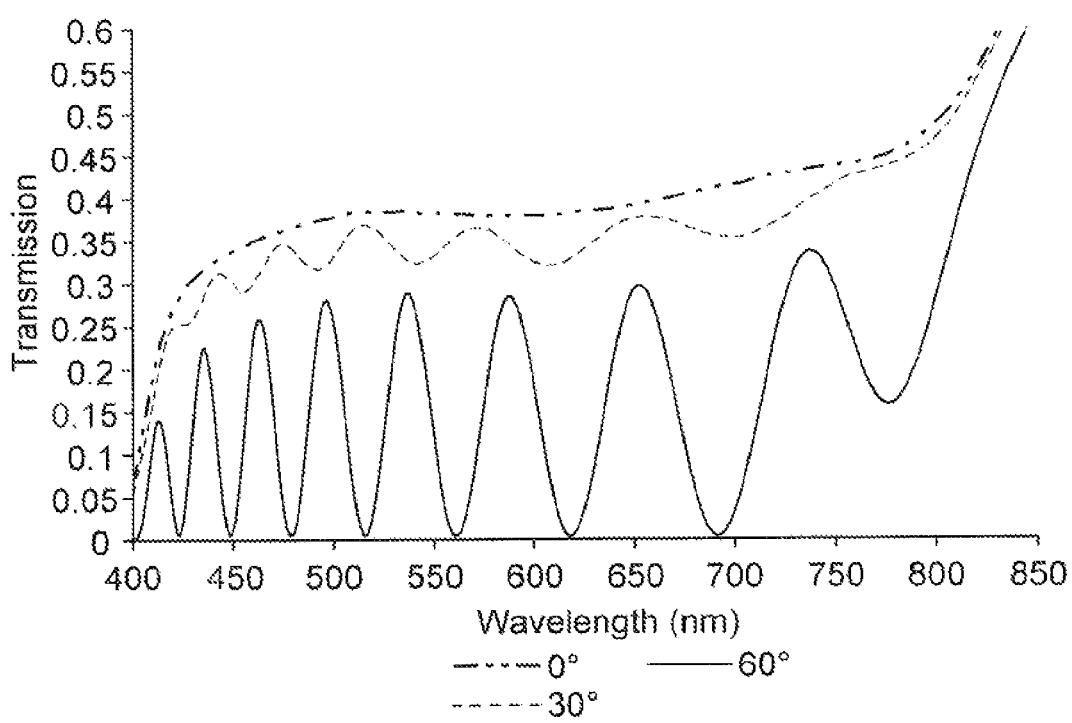
FIG. 6 is a plot of transmitted light intensity vs. wavelength for three angles of incidence at a 20 degree azimuthal angle for biaxed PET.

As can be inferred from FIG. 3, the intensity variation as a function of wavelength and therefore, the color, can depend on both the angle of incidence and the plane of incidence (azimuth). Returning to the subject of Curve 502 in FIG. 5, the biaxed PET transmission was modeled for three angles of incidence (0, 30, 60 degrees) along the φ=20 degrees azimuth. The plots in FIG. 6 show that the transmitted light intensity variation increases with angle of incidence in this case. The average intensity is greatly reduced at 60 degrees due to the deep minimum that approaches zero transmission values at multiple wavelengths. The color from this direction may be high for the same reason, even though it arises from high order fringes. The appropriate diffuse surface coating could hide this color, although the intensity will be low. In summary, this undesirable optical response results in greatly reduced average transmission values as well as noticeable color.

Figure 7:
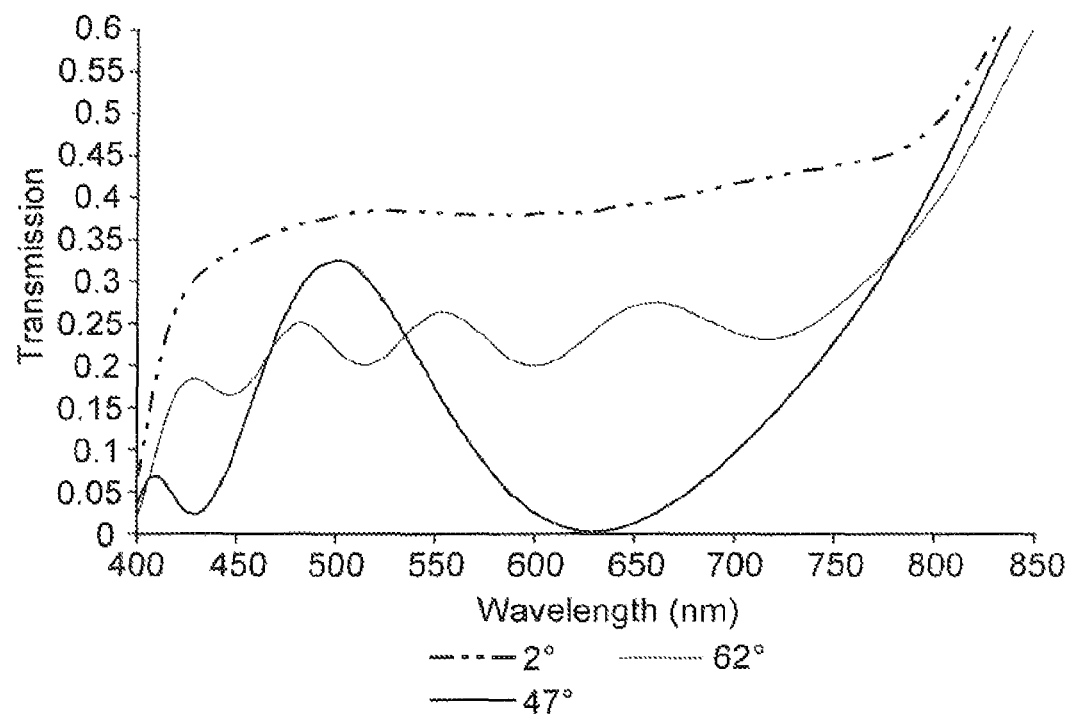
FIG. 7 is a plot of transmitted light intensity vs. wavelength for three angles of incidence at a 5 degree azimuthal angle for biaxed PET.

At angles of observation closer to the zero retardation points, the biaxed PET film exhibits much more intense color from lower order retardation fringes. This is illustrated in FIG. 7 for a plane of incidence at 5 degrees azimuth. The 47 degrees incidence in this plane is very near a zero retardation point, which is at about 47 degrees incidence and 0 degrees azimuth. Note the broad minimum in transmission for red light (i.e., at about 660 nm). It is difficult to mask this color with any diffuse coating. The average transmission for 47 degrees angle of incidence is only 12%.

Figure 8:
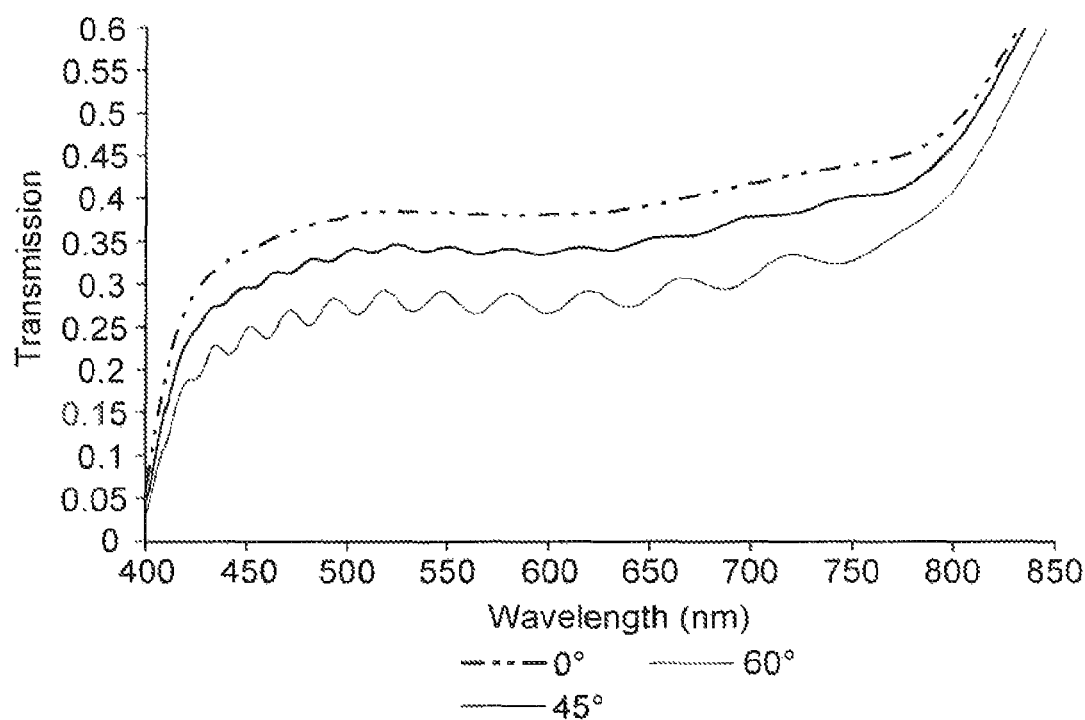
FIG. 8 is a plot of transmitted light intensity vs. wavelength for three angles of incidence at a 20 degree azimuthal angle for substantially uniaxially oriented PET.

In contrast, PET films that are oriented predominantly in the cross, or tenter, direction only (Curve 500 of FIG. 5) can provide much improved optical performance. Such films may also be described as substantially uniaxially oriented (SUO) films. The calculated transmission intensity curves for a plane of incidence at 20 degrees azimuth shown in FIG. 8 represent a very muted color that is difficult to observe under any conditions. Furthermore, the color is no different at any other set of observation angles. However, useful films are not limited to tentered-only conditions. Large values of $\theta_o$, and large retardances, can be obtained with various asymmetrically oriented films.

A substantially uniaxially oriented film of the present disclosure may be used as part of any suitable optical film known in the art. It may be treated with any compatible process known in the art. For example, its surface may be treated to impart a haze to the film. Other materials may be disposed on its surface to provide optical, mechanical, electrical, or other functions.

A substantially uniaxially oriented film may be used in a laminate with another optical film or films to enhance the mechanical properties of the other film(s). For example, substantially uniaxially oriented films may be laminated to one or both sides of a reflective polarizer to enhance the mechanical stability, handle-ability, and/or robustness of the reflective polarizer in a display application.

Figure 9:
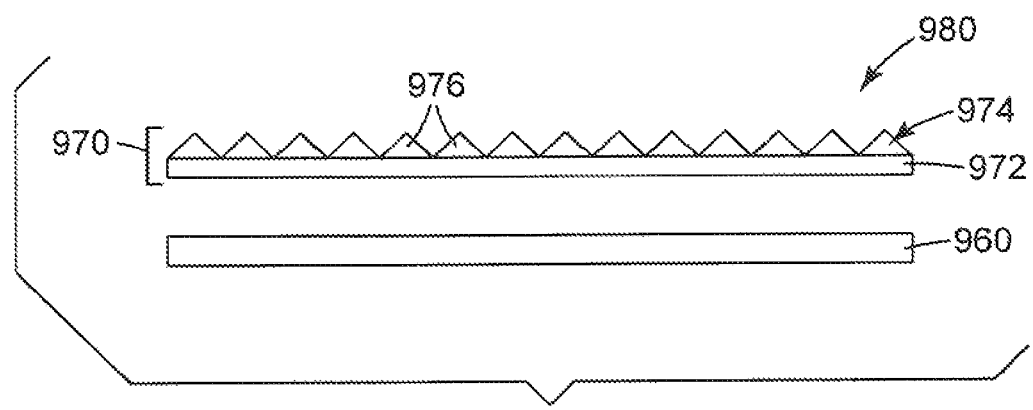
FIG. 9 is a schematic cross-sectional view of one embodiment of a film stack.

A substantially uniaxially oriented film may be used as a substrate for a directional recycling film having an elongated prism, gain diffuser, or any other suitable surface structure. For example, FIG. 9 is a schematic cross-sectional view of one embodiment of a film stack 980 including an optical film 970 and a reflective polarizer 960. In some embodiments, the optical film 970 can include a stretched polymer film substrate 972 and an optical layer 974. Further, in some embodiments, the stretched polymer film 972 can include a substantially uniaxially oriented film. In general, films 970 and 960 of FIG. 9 may be used in display systems like display system 100 of FIG. 1, and variations of optical films described in connection with FIG. 1 may also be included in films 960 and 970 of FIG. 9.

As schematically illustrated in FIG. 9, the film 970 can be suitable for use between the reflective polarizer 960 and an entrance polarizer of an LC panel (not shown). Reflective polarizer 960 may be free-standing, or it may be attached to another backlight structure, such as a diffuser plate. Directional recycling films with birefringent substrates generally have not been used between polarizers, due to issues of depolarization and unwanted color effects as discussed herein.

Figure 10:
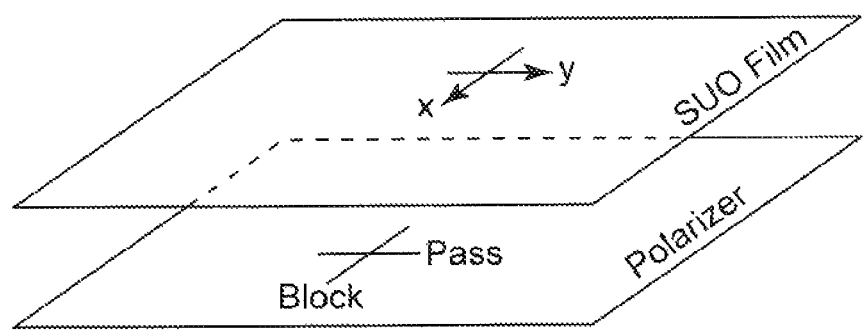
FIG. 10 depicts an azimuthal alignment of a substantially uniaxially oriented film and a polarizer.

As disclosed herein, a substantially uniaxially oriented film may be used between polarizers with acceptable results. To minimize undesired optical effects, these films can be oriented with either the fast or slow axis aligned with the block axes of the polarizers. The alignment need not be exact, but in general, closer alignment may reduce the possibility of undesired optical effects. In some embodiments, an angle between the fast axis of the substantially uniaxially oriented film and the pass axes of the polarizers can be 10 degrees or less, or 5 degrees or less. In some embodiments, it may be desirable to align the stretch axis (x-axis as generally used herein) of the substantially uniaxially oriented film with the polarizers' block axes within 10 degrees or less, or 5 degrees or less. In this alignment, the symmetry points, whether visible in air or not, are disposed along the direction of least intensity transmitted by the polarizer. This orientation is depicted in FIG. 10.

The stretched polymer film 972 can be any suitable stretched polymer film described herein, e.g., a film of stretched polyethylene terephthalate (PET), polycarbonate (PC), polypropylene, syndiotactic polystyrene, or any other suitable polymeric material. The optical layer 974 can include any suitable layer or layers, e.g., antireflective layers, antistatic layers, haze coatings, slip coatings, scratch-resistant coatings, or any compatible layers or coatings described in U.S. Pat. No. 6,368,699 (Gilbert, et al.). In some embodiments, the optical layer 974 can include a plurality of optical elements 976. In some embodiments, the optical elements 976 include refractive optical elements. Any suitable optical elements can be used, e.g., elongated prisms, beads, lenslets, pyramids, cube corners, diffractive structures, or gain diffuser structures. An optical layer 974 can be positioned proximate one or both major surfaces of the stretched polymer film 972. In the illustrated embodiment, the optical layer 974 is disposed proximate the stretched polymer film 972 such that the stretched polymer film is between the optical layer 974 and the reflective polarizer 960. The optical layer 974 can be positioned on one or both major surfaces of the stretched polymer film; alternatively, the optical layer 974 can be positioned on a support layer or layers. Any suitable technique can be used to form the optical layer 974, e.g., techniques described in co-owned U.S. patent application Ser. Nos. 61/039,637, entitled "Methods of Slide Coating Fluids Containing Oligomers" (Yapel et al.); 61/039,649, entitled "Methods of Slide Coating Two or More Fluids" (Yapel et al.); and 61/039,653, entitled "Methods of Slide Coating Two or More Fluids" (Yapel et al.).

Figure 11:
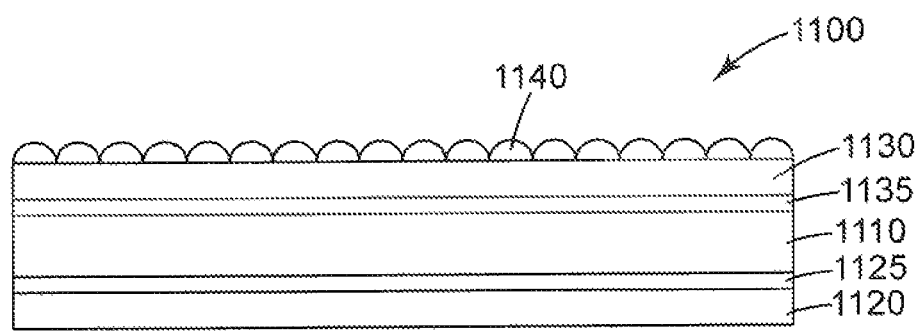
FIG. 11 is a schematic cross-sectional view of one embodiment of a multifunctional film.

In FIG. 9, films 960 and 970 are shown as physically separate films. In general, components of a backlight stack may be attached if appropriate. When multiple films are attached, their combination may be considered to constitute a multifunctional film. FIG. 11 is a schematic cross-sectional view of an exemplary multifunctional film 1100 incorporating stretched polymer films. Multifunction film 1100 includes a reflective polarizer 1110, for example, a multilayer optical film reflective polarizer as disclosed in U.S. patent application Ser. No. 61/040,910, entitled "LOW LAYER COUNT REFLECTIVE POLARIZER WITH OPTIMIZED GAIN,". On one side, the reflective polarizer 1110 can be attached or laminated to a stretched polymer film 1120 with an adhesive layer 1125. The stretched polymer film 1120 may include any suitable optical layer (e.g., haze coating) on a major surface opposite the reflective polarizer 1110. On the other side of the reflective polarizer 1110, another stretched polymer film 1130 can be attached or laminated with an adhesive layer 1135. The stretched polymer films 1120, 1130 can include any suitable film or films described herein, e.g., substantially uniaxially oriented films.

Film 1100 also includes an optical layer 1140 disposed on stretched polymer film 1130 opposite the reflective polarizer 1110. The optical layer 1140 can include any suitable optical layer or layers, e.g., those layers described herein with regard to optical layer 974 of FIG. 9, layer 154 of FIG. 1, or layers disposed on or proximate film 170 of FIG. 1.

In multifunctional film 1100, the stretch axes of the stretched polymer films 1120 and 1130 can be aligned with the block axis of the reflective polarizer 1110. The stretched polymer films 1120, 1130 can provide mechanical stability to the reflective polarizer and can provide generally good stiffness, flatness, handling robustness, and endurance of desirable properties after environmental aging.

A primer layer or coating may be applied to a stretched polymer film of the present disclosure, which may be formed from polyester, to improve adhesion between the stretched polymer film and other layers or films, such as optical layers and multilayer optical film reflective polarizers. Examples of materials that are useful in preparation of primer layers include polyacrylates, sulfonated polyesters, halogenated polymers such as poly(vinylidene chloride), poly(vinyl acetate), polyurethanes, and epoxies. Of these, preferred classes of materials include polyacrylate copolymers and sulfonated copolyesters. The primer layers may be delivered to the web as solutions in organic solvents, or as aqueous solutions or dispersions. The primer layers may be delivered to the web either before or after being stretched as described in commonly assigned U.S. Patent Publication No. 2009/0029129 (Pellerite et al.) filed on Jul. 23, 2007.

Useful acrylic copolymers include those described in U.S. Pat. No. 4,098,952 (Kelly et al.) and U.S. Pat. No. 6,893,731 (Kausch), and copolymers of methyl methacrylate and ethyl acrylate with optional functional monomers such as acrylic acid, hydroxyethyl methacrylate, and N-methylolacrylamide. Particularly preferred are the latex dispersions commercially available under the trade designations RHOPLEX 3208 and RHOPLEX GL618 from Rohm and Haas.

Useful sulfonated copolyesters include those described in U.S. Pat. No. 5,391,429 (Otani et al.), U.S. Pat. No. 5,427,835 (Morrison et al.), U.S. Pat. No. 6,893,731 (Kausch), and commonly assigned U.S. patent application Ser. No. 61/040,737, entitled "Primer Layer for Multilayer Optical Film". These copolyesters are prepared by condensation of mixtures of diols such as ethylene glycol, diethylene glycol, neopentyl glycol, and poly(caprolactone) diol, with terephthalic acid, isophthalic acid, and 5-sulfoisophthalic acid sodium salt.

The coatings may also be crosslinked by addition of crosslinking agents including melamine-formaldehyde resins, aziridines, isocyanates, and epoxies. Suitable crosslinking agents are discussed in U.S. Pat. No. 6,893,731 (Kausch). For polyacrylate-based primer coatings, melamine-formaldehyde resins such as CYMEL 327 (Cytec Industries) are preferred, whereas for sulfonated copolyester-based primer coatings, melamine-formaldehyde resins and aziridines such as NEOCRYL CX-100 (DSM) are preferred crosslinking agents. Typical levels of crosslinker are 10-50 wt % based on binder solids.

The primer coating layer may contain other optional additives to enhance processability or add other functionality to the coating. Such additives include surfactants, preferably non-ionic surfactants to enhance wetting of the coating medium on the substrate; cure catalysts such as p-toluenesulfonic acid and its ammonium salts; slip agents such as polymeric beads with diameter 0.4-5 micron to enhance roll formation when the film is processed into jumbo rolls; pH control agents such as dimethylethanolamine and other volatile amines; and antistatic agents. The latter include conducting polymers such as poly(ethylenedioxythiophene) polystyrenesulfonate as described in U.S. Pat. No. 7,041,365 (Kausch et al.); conducting nanoparticles such as antimony-doped tin oxide and vanadium oxide as described in U.S. Pat. No. 5,427,835 (Morrison et al.); high aspect ratio materials such as carbon nanotubes as described in U.S. Patent Publication 2007/0231561 A1 (Pellerite et al.); ionic materials such as lithium salts of strong acids such as lithium bromide, lithium nitrate, lithium nonafluorobutanesulfonate, and lithium bis(trifluoromethanesulfonimide); ionic materials such as monomeric quaternary ammonium salts such as CYASTAT 609; and polyacrylate copolymers bearing pendent ammonium centers such as copolymers of 2-acryloxyethyltrimethylammonium chloride as described in commonly assigned U.S. Patent Publication No. 2009/0029129 (Pellerite et al.).

Examples of useful primer coatings include RHOPLEX 3208 and CYMEL 327, and a sulfonated polyester and CYMEL 327. Nonionic surfactants for use as wetting agents may be used, such as TOMADOL 25-9, and are typically added to the dispersions at levels of 0.01-0.1 wt %. A preferred catalyst for use in these systems is diisopropano-lammmonium p-toluenesulfonate, commercially available as CYCAT 4045. Typical use levels for this catalyst are 0.1-5 wt % based on total solids, with higher levels used if curing conditions involve low temperatures. The primer layer may have a thickness of from about 6 to 25 microns wet and from about 0.25 to 10 microns after drying and before stretching.

A suitable resin for attaching a PET substantially uniaxially oriented film as disclosed herein to a multilayer optical film, such as a reflective polarizer, is described in commonly-owned and co-pending U.S. patent application Ser. No. 61/041,092, "ADHESIVE LAYER FOR MULTI-LAYER OPTICAL FILM," Jones et al. Any other adhesive or attachment method known in the art can also be used.

EXAMPLES

Example 1

In one embodiment of the present disclosure, a substantially uniaxially oriented PET film was prepared by (1) extruding approximately 1,680 kg/hr of a polyethylene terephthalate resin having an intrinsic viscosity of approximately 0.6 to produce a 0.64-mm-thick cast web at a speed of approximately 42.7 m/min, (2) preheating the cast web at 70° C. and stretching the cast web a small degree in the length direction, or machine direction (MD), of the order of 1.17 times the original unstretched dimension, (3) preheating and stretching this web at 95° C. approximately four times in the cross-web direction, or tenter direction (TD), (4) heat-setting the web at a temperature of 155° C., and (5) relaxing this web 2.5% in the TD. It is possible to produce the 0.127-mm-thick uniaxially oriented PET film at large-scale (3,000 mm width) with excellent cross-web and down-web caliper uniformity. Machine direction stretching ratios in the range of 1.05 times to 1.30 times are feasible, with the lower end of the range being determined by processability requirements (film splittiness) and the upper end of the range being determined by application performance requirements (maintenance of polarization axis alignment). The film was evaluated to determine shrinkage after being subjected to an 85 degree Celsius environment for 15 minutes. Shrinkage was determined for both of the primary directions (MD and TD) and at various positions across the full width of the film produced. These values varied across the web and were measured as 0.40% MD and 0.01% TD in the center of the film. The values measured at distances of 750 mm from the edges of the film were 0.34% MD and 0.00% TD and 0.41% MD and 0.01% TD respectively.

Example 2

In one embodiment of the present disclosure, a substantially uniaxially oriented PET film was prepared by (1) extruding approximately 1,680 kg/hr of a polyethylene terephthalate resin having an intrinsic viscosity of approximately 0.6 to produce a 0.64-mm-thick cast web at a speed of approximately 42.7 m/min, (2) preheating the cast web at 70° C. and stretching the cast web a small degree in the length direction, or machine direction (MD), of the order of 1.17 times the original unstretched dimension, (3) preheating and stretching this web at 95° C. approximately four times in the cross-web direction, or tenter direction (TD), (4) heat-setting the web at a temperature of 155° C., (5) relaxing this web 2.5% in the TD, and (6) continuously relaxing the film using a post-tenter, in-line oven set at 110° C. with the web under very low tension to further lower the shrinkage of the film in the down-web direction. It is possible to produce the 0.127-mm-thick uniaxially oriented PET film at large-scale (3,000 mm width) with excellent cross-web and down-web caliper uniformity. Machine direction stretching ratios in the range of 1.05 times to 1.30 times are feasible, with the lower end of the range being determined by processability requirements (film splittiness) and the upper end of the range being determined by application performance requirements (maintenance of polarization axis alignment). Tenter direction stretching ratios in the range of 3 to 7 times are appropriate. Heat-setting temperatures may be held sufficiently high to enhance crystallinity, but low enough to avoid adversely affecting processability with film brittleness or splittiness, or sticking of the web to tenter clips. Suitable heat-setting temperatures are generally lower than about 170° C. Post-tenter oven temperatures in the range of 100° C. to 140° C. are feasible, with the lower end of the temperature range being determined by dimensional stability requirements for the film in the product application and the upper end of the temperature range being determined by undesirable film distortion in the cross-web direction during relaxation under low tension.

The film was evaluated to determine shrinkage after being subjected to an 85 degree Celsius environment for 15 minutes. Shrinkage was determined for both of the primary directions (MD and TD) and at various positions across the full width of the film produced. These values were substantially constant across the web and were measured as 0.05% MD and 0.01% TD when an oven temperature of 110° C. was utilized for the post-tenter oven. When an oven temperature of 130° C. was utilized for the post-tenter oven, shrinkages of 0.02% MD and 0.00% TD were measured. The resultant film exhibits desirable optical properties and desirable thermal expansion coefficients (58 ppm/° C. and 1 ppm/° C. for the MD and TD respectively) and shrinkage properties. The resultant film has excellent dimensional stability up to the maximum use temperature of 85° C.

Figure 12:
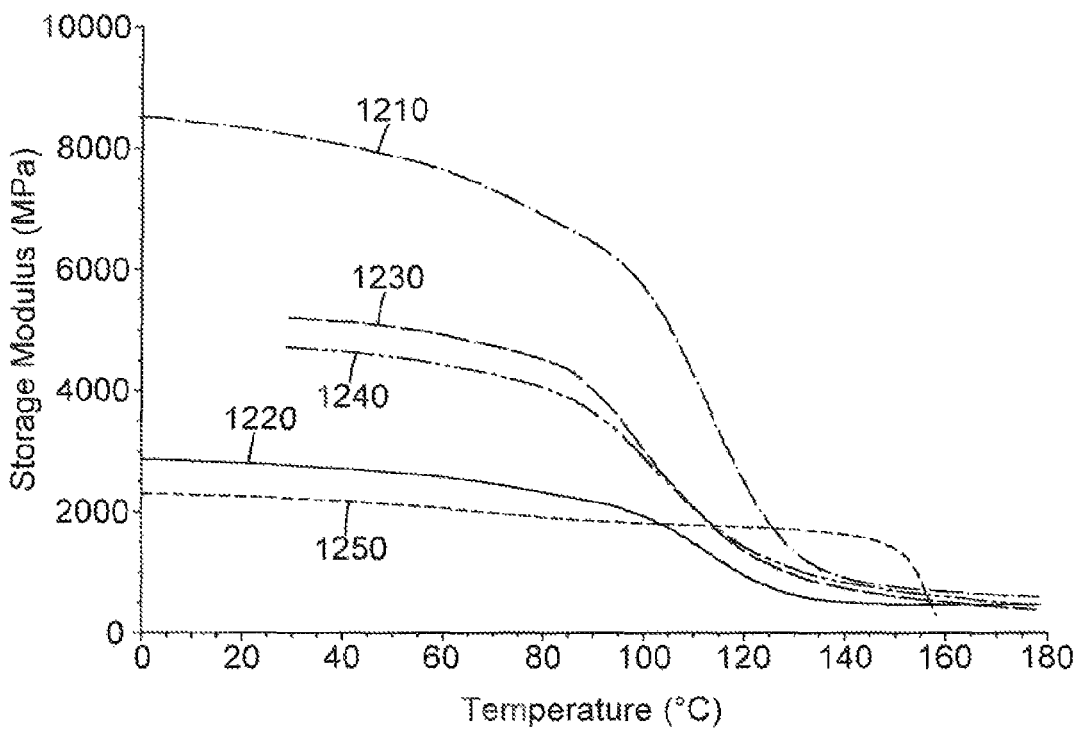
FIG. 12 is a plot of storage modulus vs. temperature for polymeric films in tenter and machine directions.

The tentered PET film of Example 2 exhibits high stiffness in the primary direction of orientation (TD) compared with other films, such as biaxially oriented PET or polycarbonate. FIG. 12 shows modulus data for the tentered PET in comparison with conventionally manufactured biaxially oriented PET film and polycarbonate film. Curve 1210 corresponds to tentered PET (TD), curve 1220 to tentered PET (MD), curve 1230 to biaxed PET (TD), curve 1240 to biaxed PET (MD), and curve 1250 to polycarbonate (MD). These data were obtained using dynamic mechanical analysis according to the techniques described in ASTM D4065. A TA Instruments, Inc. Dynamic Mechanical Analyzer, Model Q800 was used for the testing. All samples were tested in tension using a film clamp. The samples were heated at a rate of 2° C./minute. The oscillation frequency was 1 Hz and the oscillation strain was 0.1%. Samples were typically 6 mm in width and 15.5 mm in length.

When a film such as that of Example 2 is used as a lamination substrate with thin (0.032 mm-0.094 mm) reflective polarizer film, such as DBEF, available from 3M Company, as the core, the film enhances the part stability (tendency to buckle) of the laminate in a display. The PET film of Example 2 was laminated on each side of a reflective polarizer film using a UV-curable adhesive between each of the layers. The UV-curable adhesive is described in U.S. patent application Ser. No. 61/041,092, "ADHESIVE LAYER FOR MULTILAYER OPTICAL FILM," Jones et al. Before laminating, the PET film was primed with a coating formulation consisting of about 6 wt % RHOPLEX 3208 (Rohm and Haas Co.) solids, about 0.6 wt % CYMEL 327 (Cytec Industries Inc.) solids, about 0.1 wt % CYCAT 4045 (Cytec Industries Inc.) solids, and about 0.1 wt % TOMADOL 25-9 (Tomah Chemical Co.) in deionized water. Mixing order was as follows: water, surfactant, binder, crosslinker, catalyst. This mixture was coated on the polyester substrate at a wet film thickness of 6 microns. The film was then passed through a drying oven at 65° C. to give a dry film thickness of about 0.4 microns. The PET film and the reflective polarizer film were laminated such that the MD of the PET film was substantially aligned with the MD of the reflective polarizer film. Laminates are used in liquid crystal display televisions (LCD-TVs) with the substrate TD aligned in the vertical direction.

Laminates must remain dimensionally stable during and after exposure to temperatures and temperature cycles, such as observed in an LCD-TV. When large-sized laminated parts are produced, the part tolerances must be substantially retained after exposure to elevated temperature for long periods of time or when exposed to temperature cycling.

A method for observing dimensional stability in laminates was used for laminates made with films of Example 1 and Example 2. The procedure followed for each laminate was: Two 24.1 cm×31.8 cm pieces of double-strength glass were cleaned using isopropyl alcohol to remove any dust. A 22.9 cm×30.5 cm piece of laminate film was attached to one piece of the glass on the two short sides and one of the long sides, leaving the remaining long side unconstrained. The laminate film was attached to the glass using 3M™ double-coated tape 9690 (3M, St. Paul, Minn.) such that the tape was 1.3 cm from the three edges of the glass covered by the three sides of the laminate film. The laminate film was attached to the tape so that it was held above the glass surface by the thickness of the tape (about 0.14 mm). The laminate was adhered to the tape using a 2 kg roller, passing the roller over each tape side one time in each direction. Equivalent thickness and lengths of 1.3-cm wide PET film shim stock were next placed onto the opposite side of the laminate and centered over the tape. The second piece of glass was placed on top of the shims and was exactly aligned with the bottom piece of glass. This completed the sandwiched test module of glass-tape-laminate film-shim-glass, in which the laminate film was constrained at three edges and substantially free-floating in the center. This module was attached together using four binder clips, as are commonly used to hold stacks of paper together (Binder Clips, Officemate International Corporation, Edison, N.J.). The clips were of an appropriate size to apply pressure to the center of the tape approximately 1.9 cm from the edge of the glass. The binder clips were positioned two each on the short sides of the module, each about 1.9 cm from the top edge of the laminate film held between the glass plates of the module.

The completed glass plate module was placed in a thermal shock chamber (Model SV4-2-2-15 Environmental Test Chamber, Envirotronics, Inc., Grand Rapids, Mich.) and was subjected to 84 temperature cycles. Each temperature cycle included cooling the module to −35° C., followed by holding at that temperature for one hour and then increasing the oven temperature in a single step to 85° C., followed by holding at that temperature for one hour. Following the temperature cycling, the laminate film was then removed from the module and inspected for wrinkles. The product performance was considered unacceptable if there were visible wrinkles in the laminate film following the thermal shock test.

Figure 13A:
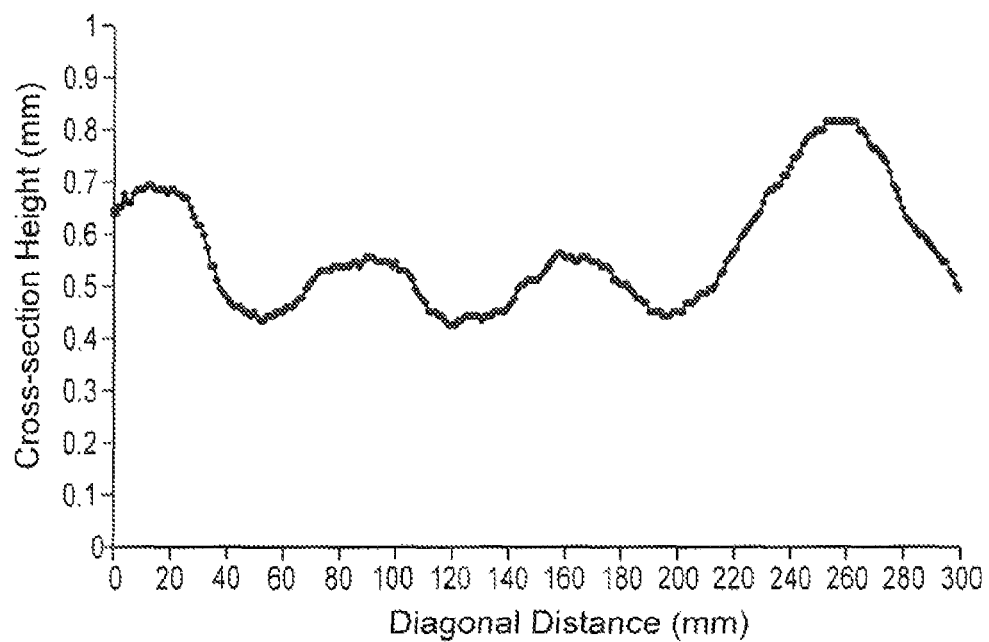
FIG. 13a is a plot of cross-sectional height vs. diagonal position for the film of Example 1.
Figure 13B:
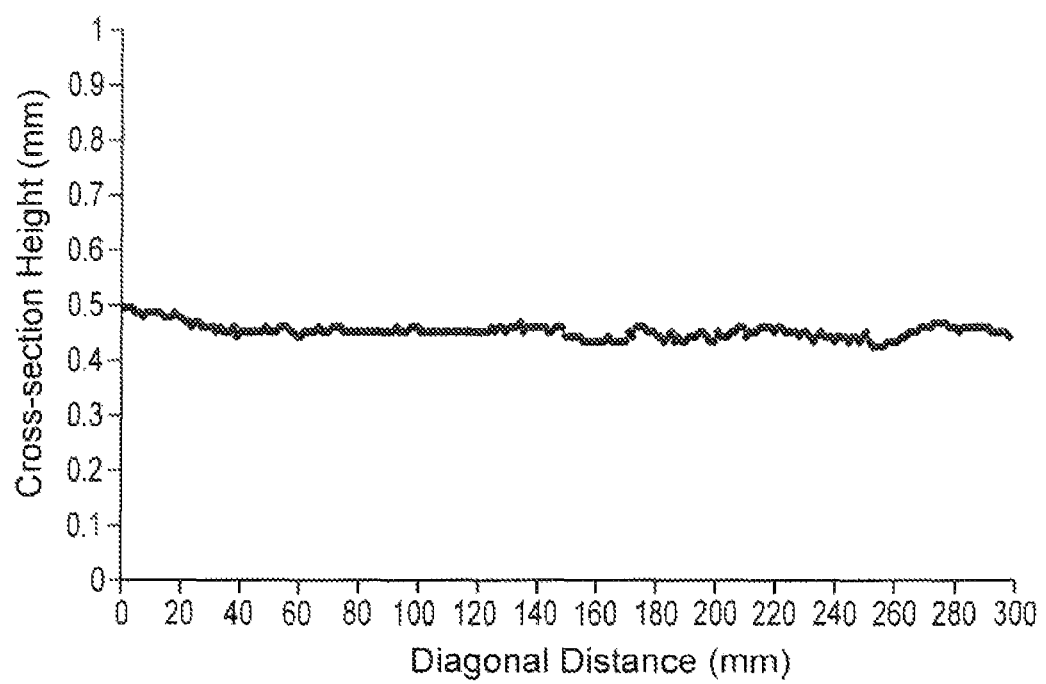
FIG. 13b is a plot of cross-sectional height vs. diagonal position for the film of Example 2.

FIG. 13a shows the cross-sectional thickness profile of the height variation of a film laminate prepared using the film of Example 1 and FIG. 13b shows the cross-sectional thickness profile of the height variation of a film laminate prepared using the film of Example 2, both following the thermal shock test described above.

Laminates prepared using films from Example 1 and Example 2 were prepared and were converted to fit a 32" diagonal LCD-TV (660 mm×473.8 mm). Each part was placed between two pieces of 3.2-mm-thick polycarbonate sheeting having a fixed gap in the thickness direction of 3 mm. The polycarbonate sheets were clamped together to maintain module integrity. These modules were placed in an oven at 85° C. and were held with the 473.8 mm edge in the vertical direction. The modules were stored for 96 hours at 85° C. The modules were removed from the oven and were cooled to room temperature before disassembly. The laminate parts were then examined for distortion and dimension change. Laminate prepared using films of Example 1 showed considerable distortion. When placed on a flat surface, the diagonal corners of the part were raised approximately 10 mm from the plane of the test surface and exhibited distinct waviness perpendicular to the MD of the film. In contrast, the laminate prepared using films of Example 2 were completely flat and parallel to the plane of the test surface and exhibited no waviness in either direction.

While the present disclosure has discussed the advantages of using substantially uniaxially oriented films between polarizers in backlights, substantially uniaxially oriented films may generally find utility in backlights regardless of whether they are between polarizers or not. Substantially uniaxially oriented films may demonstrate other properties that make them advantageous to other optical films in backlight applications. Substantially uniaxially oriented films can provide optical films having desirable mechanical properties with desirably low haze at a cost advantage relative to other optical films.

Unless otherwise indicated, references to "backlights" are also intended to apply to other extended area lighting devices that provide nominally uniform illumination in their intended application. Such other devices may provide either polarized or unpolarized outputs. Examples include light boxes, signs, channel letters, and general illumination devices designed for indoor (e.g., home or office) or outdoor use, sometimes referred to as "luminaires." Note also that edge-lit devices can be configured to emit light out of both opposed major surfaces (i.e., both out of the "front reflector" and "back reflector" referred to above) in which case both the front and back reflectors are partially transmissive. Such a device can illuminate two independent LCD panels or other graphic members placed on opposite sides of the backlight. In that case the front and back reflectors may be of the same or similar construction.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An optical film, comprising:
   a reflective polarizer having a pass axis; and
   a stretched polymer film having an x-axis in a direction of greatest stretch, a z-axis normal to a plane of the stretched polymer film, and a y-axis perpendicular to both the x-axis and the z-axis, wherein the stretched polymer film is laminated to the reflective polarizer;
   wherein the stretched polymer film exhibits a refractive index symmetry point at an angle of incidence in air of at least about 60 degrees with respect to the z-axis in an x-z plane;
   wherein an angle between the y-axis of the stretched polymer film and the pass axis of the reflective polarizer is less than about 10 degrees.

2. The optical film of claim 1, wherein the stretched polymer film is monolithic.

3. The optical film of claim 1, wherein the stretched polymer film comprises polyethylene terephthalate.

4. The optical film of claim 1, further comprising an optical layer disposed proximate the stretched polymer film such that the stretched polymer film is between the optical layer and the reflective polarizer.

5. The optical film of claim 4, wherein the optical layer is diffuse.

6. The optical film of claim 4, wherein the optical layer comprises a plurality of refractive elements.

7. The optical film of claim 6, wherein the plurality of refractive elements comprises beads.

8. The optical film of claim 6, wherein the plurality of refractive elements comprises elongated prisms.

9. The optical film of claim 1, wherein the stretched polymer film and the reflective polarizer are laminated with an adhesive.

10. An optical film, comprising:
    a reflective polarizer having a pass axis; and
    a stretched polymer film having an x-axis in a direction of greatest stretch, a z-axis normal to a plane of the stretched polymer film, and a y-axis perpendicular to both the x-axis and the z-axis, wherein the stretched polymer film is attached to the reflective polarizer;
    wherein the stretched polymer film exhibits a refractive index symmetry point at an angle of incidence in air of at least about 60 degrees with respect to the z-axis in an x-z plane, and further wherein the stretched polymer film comprises a polymeric material not present in the reflective polarizer;
    wherein an angle between the y-axis of the stretched polymer film and the pass axis of the reflective polarizer is less than about 10 degrees.

11. An optical film, comprising:
    a reflective polarizer having first and second major surfaces;
    a first stretched polymer film laminated with a first adhesive layer to the first major surface of the reflective polarizer;
    a second stretched polymer film laminated with a second adhesive layer to the second major surface of the reflective polarizer; and
    an optical layer disposed proximate the second stretched polymer film such that the second stretched polymer film is between the optical layer and the reflective polarizer;
    wherein each of the first and second stretched polymer films exhibits a refractive index symmetry point at an angle of incidence in air of at least about 90 degrees.

12. A display system comprising a backlight, wherein the backlight comprises:
    an illumination device;
    a reflective polarizer having a pass axis; and
    a stretched polymer film having an x-axis in a direction of greatest stretch, a z-axis normal to a plane of the stretched polymer film, and a y-axis perpendicular to both the x-axis and the z-axis, the stretched polymer film disposed such that the reflective polarizer is between the illumination device and the stretched polymer film;
    wherein the stretched polymer film exhibits a refractive index symmetry point at an angle of incidence in air of at least about 60 degrees with respect to the z-axis in an x-z plane;
    wherein an angle between the y-axis of the stretched polymer film and the pass axis of the reflective polarizer is less than about 10 degrees.

13. The display system of claim 12, further comprising a dichroic polarizer, wherein the stretched polymer film is disposed between the reflective polarizer and the dichroic polarizer.

14. The display system of claim 12, wherein an angle between the y-axis of the stretched polymer film and the pass axis of the reflective polarizer is less than about 10 degrees.

15. The display system of claim 12, further comprising a liquid crystal panel positioned such that the stretched polymer film is between the illumination device and the liquid crystal panel.

16. A display system comprising a backlight, wherein the backlight comprises:
    a polarized illumination device having a polarization axis; and
    a stretched polymer film having an x-axis in a direction of greatest stretch, a z-axis normal to a plane of the stretched polymer film, and a y-axis perpendicular to both the x-axis and the z-axis, the stretched polymer film positioned to receive a polarized light from the polarized illumination device;
    wherein the stretched polymer film exhibits a refractive index symmetry point at an angle of incidence in air of at least about 60 degrees with respect to the z-axis in an x-z plane.

17. The display system of claim 16, wherein an angle between the y-axis of the stretched polymer film and the polarization axis of the polarized illumination device is less than about 10 degrees.

18. A display system comprising a backlight, wherein the backlight comprises:
    an illumination device; and
    a stretched polymer film;
    wherein the stretched polymer film exhibits retardation of at least 3000 nm along all optical paths incident upon the stretched polymer film at an angle of incidence in air less than about 50 degrees.

19. A method of making an optical film comprising forming a stretched polymer film, wherein forming the stretched polymer film comprises:
    forming a web of a polyethylene terephthalate;
    stretching the web in a length direction by a first amount of about 1.05 to 1.3 times an unstretched length dimension;

stretching the web in a transverse direction by a second amount of about 3 to 7 times an unstretched transverse dimension;

heat-setting the web;

relaxing the web in the transverse direction; and relaxing the web in an oven while unrestrained in the transverse direction and under minimal tension in the length direction.

20. The method of claim 19, wherein the resulting stretched polymer film exhibits a refractive index symmetry point at an angle of incidence in air of at least about 90 degrees.

21. The method of claim 19, wherein the resulting stretched polymer film exhibits retardation of at least 3000 nm along all optical paths incident upon the stretched polymer film at an angle of incidence in air less than about 50 degrees.

22. The method of claim 19, further comprising disposing an optical layer on the stretched polymer film.

23. The method of claim 19, further comprising attaching the stretched polymer film to a reflective polarizer.

\* \* \* \* \*

UNITED STATES PATENT AND TRADEMARK OFFICE
CERTIFICATE OF CORRECTION

PATENT NO. : 9,664,834 B2
APPLICATION NO. : 12/935485
DATED : May 30, 2017
INVENTOR(S) : Ellen Bosl Page 1 of 1

It is certified that error appears in the above-identified patent and that said Letters Patent is hereby corrected as shown below:

In the Drawings

Sheet 1 of 8 (Fig. 2)
Line 5 (Approx.), Delete "$n_{0f}$" and insert -- $n_{\theta f}$ --, therefor.

In the Specification

Column 6
Line 39, Delete "HIM" and insert -- IIIM --, therefor.
Line 39, Delete "HIT." and insert -- IIIT. --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*